United States Patent
Fard et al.

(10) Patent No.: US 10,331,287 B2
(45) Date of Patent: Jun. 25, 2019

(54) USER INTERFACE SPACES

(71) Applicant: Apple Inc., Cupertino, CA (US)

(72) Inventors: Assana Fard, Sunnyvale, CA (US); John O. Louch, San Luis Obispo, CA (US); Ralph Brunner, Cupertino, CA (US); Haroon Sheikh, Campbell, CA (US); Eric Steven Peyton, Lisle, IL (US); Christopher Hynes, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 324 days.

(21) Appl. No.: 14/866,566

(22) Filed: Sep. 25, 2015

(65) Prior Publication Data

US 2016/0018955 A1    Jan. 21, 2016

Related U.S. Application Data

(63) Continuation of application No. 11/462,623, filed on Aug. 4, 2006.

(51) Int. Cl.
| | |
|---|---|
| *G06F 3/0481* | (2013.01) |
| *G06F 3/0484* | (2013.01) |
| *G06F 17/30* | (2006.01) |
| *G09G 5/14* | (2006.01) |
| *G06F 3/0488* | (2013.01) |
| *G06T 13/80* | (2011.01) |

(52) U.S. Cl.
CPC ........ *G06F 3/0481* (2013.01); *G06F 3/04842* (2013.01); *G06F 3/04845* (2013.01); *G06F 3/04847* (2013.01); *G06F 3/04886* (2013.01); *G06T 13/80* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 5,371,847 A | 12/1994 | Hargrove | |
| 5,564,002 A * | 10/1996 | Brown | G09G 5/14 715/778 |
| 6,711,564 B2 | 3/2004 | Crucs | |
| 6,915,490 B1 | 7/2005 | Ewing | |
| 6,966,033 B1 | 11/2005 | Gasser | |
| 7,506,265 B1 * | 3/2009 | Traut | G06F 9/4443 715/763 |
| 7,533,349 B2 | 5/2009 | Saul | |
| 2003/0179240 A1 | 9/2003 | Gest | |
| 2003/0189597 A1 * | 10/2003 | Anderson | G06F 3/0481 715/778 |
| 2005/0188312 A1 * | 8/2005 | Bocking | H04M 1/27455 715/739 |
| 2006/0245237 A1 | 11/2006 | Nguyen | |
| 2007/0234226 A1 | 10/2007 | Szeto | |

* cited by examiner

*Primary Examiner* — Nhat Huy T Nguyen
(74) *Attorney, Agent, or Firm* — Fernando & Partners, LLP; Bejan Hafezzadeh

(57) ABSTRACT

A user interface can have one or more spaces presented therein. A space is a grouping of one or more program windows in relation to windows of other application programs, such that the program(s) of only a single space is visible when the space is active. A view can be generated of all spaces and their contents.

18 Claims, 21 Drawing Sheets

USER INTERFACE SPACES

CROSS-REFERENCE TO RELATED APPLICATIONS

This application is a continuation application of and claims priority to U.S. patent application Ser. No. 11/462,623, filed on Aug. 4, 2006, the entire contents of which are hereby incorporated by reference.

TECHNICAL FIELD

The disclosed implementations relate generally to graphical user interfaces.

BACKGROUND

A hallmark of modern graphical user interfaces is that they allow a large number of graphical objects or items to be displayed on a display screen at the same time. Leading personal computer operating systems, such as Apple Mac OS®, provide user interfaces in which a number of windows can be displayed, overlapped, resized, moved, configured, and reformatted according to the needs of the user or application. Taskbars, menus, virtual buttons and other user interface elements provide mechanisms for accessing and activating windows even when they are hidden behind other windows.

As a result, most computers today are capable of running a great number of different programs. This can be done by the computer executing software code locally available to the computer or by connecting the computer to a remote application server, for example over the internet. Examples of application programs include mainly business-related software such as records management programs and meeting organization programs, software that is used alternatively for business or personal use, such as word processors or email applications, and software that is mainly intended for personal use such as online chat or music file management programs.

With the large number of different applications available, users are encouraged to work with a multitude of items in their computers. Some categories of items, such as files of a certain type, can be limited to use by a particular application program, while other item categories can be compatible with several programs. Depending on the user's needs, he or she can need to use several different programs in a limited period of time as part of a daily work routine or to accomplish a particular goal. This is one reason why users sometimes have several windows open on the computer display at the same time.

However, with too many windows open at once, the desktop can become cluttered and difficult to overview. As a result, it can be difficult for the user to find a particular application when needed.

SUMMARY

The invention relates to user interfaces.

In a first general aspect, a method for managing content in a user interface includes enabling several spaces for assigning thereto contents of a user interface such that the assigned contents are visible when any of the spaces is active. The user interface is configured to generate a view where all the several spaces are presented separate from each other and having their assigned contents visible. The method includes registering an assignment of a first content portion to a first one of the spaces.

Implementations can include any or all of the following features. The contents of the user interface can include at least one selected from the group consisting of: an application and a window. The method can further include monitoring whether the first content portion is visible in the first space and, upon detecting that the first content portion is not visible, showing an indication associated with the first content portion in the first space. The indication can be at least one selected from the group consisting of: a control tool for the first content portion, a heads-up display image for the first content portion, a branding associated with the first content portion, and combinations thereof. A user can move the indication from the first space to the second space, and the method can further include reassigning the first content portion to the second space. The method can further include assigning a second content portion to multiple ones of the several spaces, and the second content portion can be visible when any of the multiple spaces are active. The method can further include registering that the first content portion is moved. The first content portion can be moved within the first space. The first content portion can be moved from the first space to a second one of the several spaces, and the first content portion can be visible when the second space is active, and the first content portion can not be visible when the first space is active. The first content portion can be assigned to a second one of the spaces before the assignment, and the assignment can be performed upon registering an input made with a pointing device at a location in the second space associated with reassigning content to another space, and the first space can be identified as a target for the reassignment based on the location. The assignment can include several content portions from the second space, and the location can be configured for performing reassignments of multiple content portions. The multiple content portions can be defined as at least one category from the group consisting of: portions that have a common type, portions that belong to a common application, and combinations thereof. The assignment can be registered upon the first content portion being brought, in a currently active second space, to a location associated with reassigning content to another space, and the first space can be identified as a target for the reassignment based on the location. The location can be a corner of the second space. An order of the several spaces can be defined, and the assignment can be made to the first space because it is a next space in the order. The several spaces can be defined in a geometrical relationship to each other, and the corner can indicate a direction of the assignment in the geometrical relationship. The first content portion can be associated with an application program that is being initiated, and the first space can be generated in response to the initiation. The first content portion can be assigned to the first space together with at least another content portion. The first and second content portions can be reassigned together because they have previously been grouped. The first and second content portions can be reassigned together because they have a common type. The several spaces can be presented in a grid format in the view, the grid format including at least one row and at least one column for the several spaces. The method can further include altering the grid format, in response to a user input, to add or remove at least one space. The method can further include relocating at least one space in the grid format in response to a user input. The first content portion can be automatically assigned to the first space because the first portion has a type that has previously been assigned as belonging in the first space. The assignment of the type as belonging in the first space can be done based on tracking use of contents in the user interface. The assignment can be done at a configuration screen that includes visual representations of at least one space and an assignment area where content portions can be defined as belonging to at least one of the spaces. The assignment can be done upon a user dragging the first content portion to one of the visual representations that corresponds to the first space. The first content portion can be dragged to the corresponding visual representation from a screen location outside the configuration screen. The first content portion can be dragged to the corresponding visual representation from the assignment area, and an earlier assignment that the first content portion had in the assignment area can be replaced with the assignment being registered. When the view where all the several spaces are presented separate from each other is displayed, the user can move one of the spaces to a new location in the view, and the method can further include animating the move.

In a second general aspect, a method for managing content in a user interface includes displaying, in a user interface, a first subset of current user interface contents that is assigned to a first space. A second subset of the current user interface contents that is assigned to a second space is currently not displayed. The method further includes performing a transition, in response to an event, from the first space to the second space. The transition includes ceasing to display the first subset and displaying the second subset in the user interface.

Implementations can include any or all of the following features. The current user interface contents can include at least one selected from the group consisting of: an application and a window. The event can be a user input that requests the transition by identifying the second space. The event can be a user input that requests the transition by identifying a content portion and not by identifying the second space, and the method can further include determining which of the first and second spaces the identified content portion is assigned to, wherein the second subset is displayed following a determination that the identified content portion is assigned to the second space. The event can be a user input made with a pointing device at a location in the first space associated with transitioning to the second space. An order of the first and second spaces can be defined, and the transition can be made to the second space because it is a next space in the order. The transition can be made to the second space because it is a most recently activated space before the first space. The location can be a corner of the first space. The second subset can be associated with an application program that is being initiated, and the transition can be performed in response to the initiation. The transition can be conditioned on the application program meeting a criterion. The criterion can be that the application program has a type that implies user interface action. The method can further include animating the transition to show the first subset being moved out of a viewable area and the second subset being moved into the viewable area. The first and second spaces can be defined based on a matrix that is larger than a viewable area of the user interface, and the transition can include selecting a portion of the matrix for display that includes the second space. The method can further include displaying an input control upon displaying the first subset, the input control can illustrate the matrix and also be visible when the second subset is displayed, and the event can be a user input that is made using the input control. The method can further include receiving an Exposé command when the first subset or the second subset is being displayed, and the first or second subset can be rearranged in response to the Exposé command. There can also be displayed an inset pane representing the second space, the inset screen can show the second subset, and the event can be received upon user activation of the inset pane. Several spaces, including the first and second spaces and also additional spaces, can be defined, and the inset pane can present contents from any of the several spaces while any of the several spaces is active. The transition can be done as part of reassigning a content portion of the first space to the second space. An indication of the content portion can be presented in the first space because it is detected that the content portion is currently not visible in the first space, and the reassignment can be registered upon the indication being brought, in the first space, to a location associated with reassigning content to the second space. The reassignment can be registered upon the content portion being brought, in the first space, to a location associated with reassigning content to the second space. The reassignment can be defined to include any contents having a particular type. The transition can be performed upon an application or window being initiated, the application or window being assigned to the second space and not to the first space. Several spaces, including the first and second spaces and also additional spaces, can be defined, and the application or window can be assigned also to at least one of the additional spaces, and the method can further include sequentially activating the spaces to which the application or window is assigned, upon receiving repeated inputs with an activation control for the application or window. The first and second subsets can correspond to respective first and second entries on a process list, and the method can further include rearranging at least one of the first and second entries in response to the event to generate a rearranged process list. The method can further include displaying a representation of the rearranged process list.

In a third general aspect, a computer program product is tangibly embodied in an information carrier and includes instructions that, when executed, generate on a display device a graphical user interface for managing user interface content. The graphical user interface includes a first view displayed in a non-space mode. The first view presents current user interface contents wherein first and second subsets of the current user interface contents have been assigned to first and second spaces, respectively. The graphical user interface includes a second view displayed in a space view mode. The second view presents the first and second work spaces separately, each space including the respective assigned subset of the current user interface contents.

Implementations can include any or all of the following features. The current user interface contents can include at least one selected from the group consisting of: an application and a window. Several spaces, including the first and second spaces and also additional spaces, can be presented in the space view mode, and additional subsets of the current user interface contents can be assigned to the additional spaces. The several spaces can be presented in a grid format in the space view mode, and the grid format can include at least one row and at least one column for the several spaces. A first content portion can be been assigned to both the first and second spaces, and, in the space view mode, the first content portion can be presented in the first space and also in the second space. A transition in the user interface to deactivate the first space and to activate the second work space can be animated. The transition can be animated to show the first subset of the current user interface contents being moved out of a viewable area and the second subset being moved into the viewable area. The graphical user interface can further include a third view displayed when the first space is active and the second space is not active. The third view can present the first subset of the current user interface contents and not the second subset. The third view can include an input control that is associated with transitioning from the first space to the second space. The third view can include a location associated with reassigning content to another space, and a user can initiate the reassignment by moving a subset to the location. An order of the first and second spaces can be defined, and the reassignment can be made to the second space because it is a next space in the order. The location can be configured to be highlighted to indicate that the subset can be automatically moved to the other space. In the second view displayed in the space view mode, the first and second spaces can be presented in a grid format, and the location in the third view can correspond to a direction from the first space to the other space in the grid format. Several spaces can be defined, including the first and second spaces, and the third view can include several locations corresponding to the several spaces. The third view can include a location where a pointing device can be brought to switch from the first space to the second space. The location can be configured for performing reassignments of multiple subsets. The multiple subsets can be defined as at least one category from the group consisting of: subsets that have a common type, subsets that belong to a common application, and combinations thereof. A user can move one of the first and second spaces to a new location in the second view, and the move can be animated.

DETAILED DESCRIPTION

Figure 1:
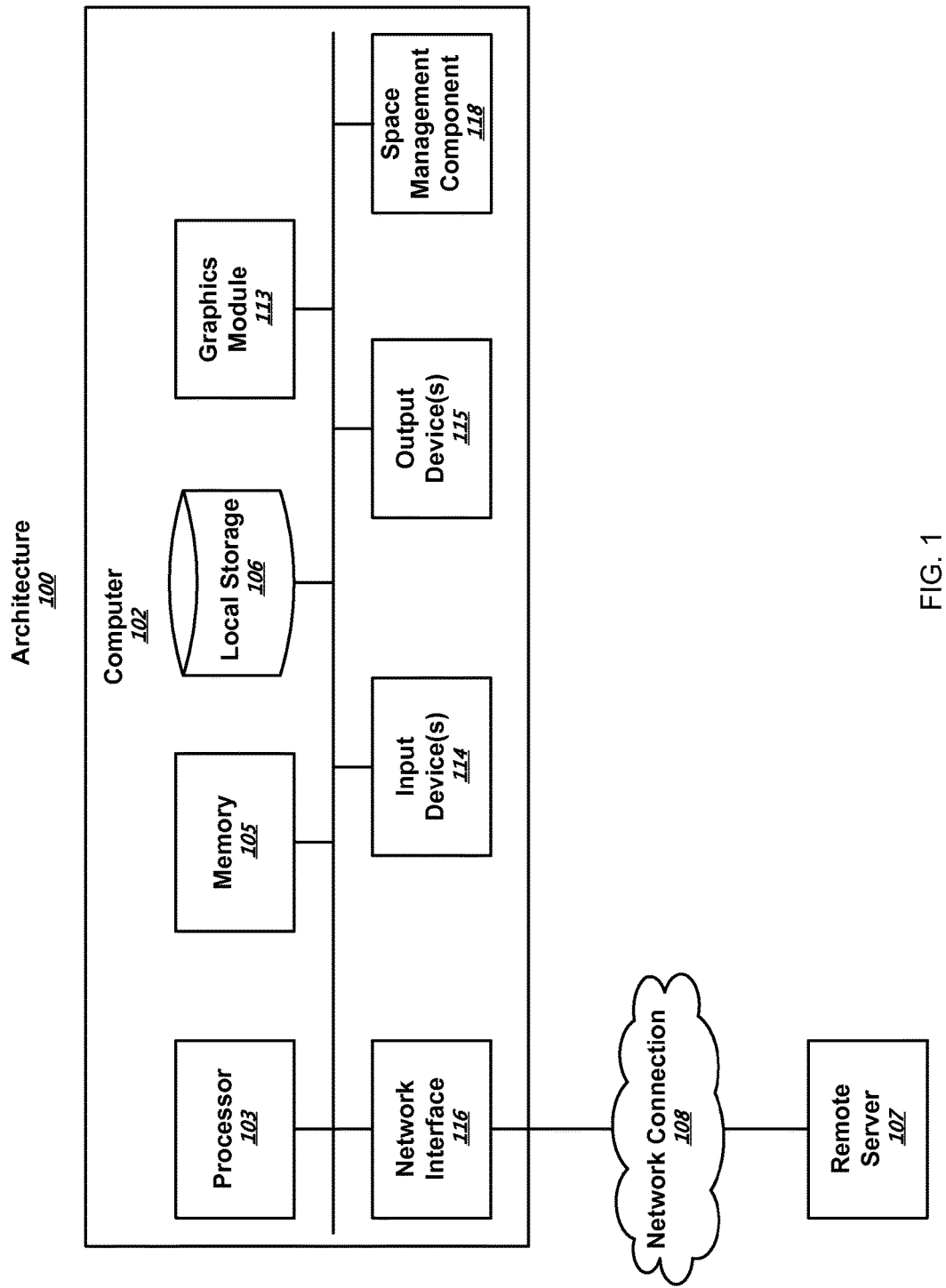
FIG. 1 is a block diagram of an architecture for presenting a user interface that includes one or more spaces containing program windows.

FIG. 1 is a block diagram of an architecture 100 (e.g., a hardware architecture) for presenting a user interface that includes one or more spaces containing program windows. As used herein, a space is a grouping of one or more applications, or windows, in relation to other applications or windows, such that the program(s)/applications of a single space is visible when the space is active, and so that a view can be generated of all spaces and their contents. An application program can have more than one window in a space, or an application can have windows in more than one space, to name a few examples.

The architecture 100 includes a personal computer 102 coupled to a remote server 107 via a network interface 116 and a network 108 (e.g., local area network, wireless network, Internet, intranet, etc.). The computer 102 generally includes a processor 103, memory 105, one or more input devices 114 (e.g., keyboard, mouse, etc.) and one or more output devices 115 (e.g., a display device). A user interacts with the architecture 100 via the input and output devices 114, 115. Architecture 100 as disclosed includes various hardware elements. Architecture 100 can include hardware, software, and combinations of the two.

The computer 102 also includes a local storage device 106 and a graphics module 113 (e.g., graphics card) for storing information and generating graphical objects, respectively. The local storage device 106 can be a computer-readable medium. The term "computer-readable medium" refers to any medium that participates in providing instructions to a processor for execution, including without limitation, non-volatile media (e.g., optical or magnetic disks), volatile media (e.g., memory) and transmission media. Transmission media includes, without limitation, coaxial cables, copper wire, fiber optics, and computer buses. Transmission media can also take the form of acoustic, light or radio frequency waves.

Systems and methods are provided for generation and use of spaces. The systems and methods can be stand alone, or otherwise integrated into a more comprehensive application. In the materials presented below, an integrated system for generating and using spaces is disclosed.

While generation and use of spaces are described herein with respect to a personal computer 102, it should be apparent that the disclosed implementations can be incorporated in, or integrated with, any electronic device, e.g., a device that has a visual user interface, including without limitation, portable and desktop computers, servers, electronics, media players, game devices, mobile phones, email devices, personal digital assistants (PDAs), embedded devices, televisions, etc.

One of ordinary skill in the art will recognize that the engines, methods, processes and the like that are described can themselves be an individual process or application, part of an operating system, a plug-in, an application or the like. In one implementation, the system and methods can be implemented as one or more plug-ins that are installed and run on the personal computer 102. The plug-ins are configured to interact with an operating system (e.g., MAC OS® X, WINDOWS XP, LINUX, etc.) and to perform the various functions, as described with respect to the Figures. A system and method for generation and use of spaces can also be implemented as one or more software applications running on the computer 102. Such a system and method can be characterized as a framework or model that can be implemented on various platforms and/or networks (e.g., client/server networks, stand-alone computers, portable electronic devices, mobile phones, etc.), and/or embedded or bundled with one or more software applications (e.g., email, media player, browser, etc.). The architecture 100 includes a space component 118 that is configured to generate and use spaces, for example by presenting them on the display device 113.

Figure 2:
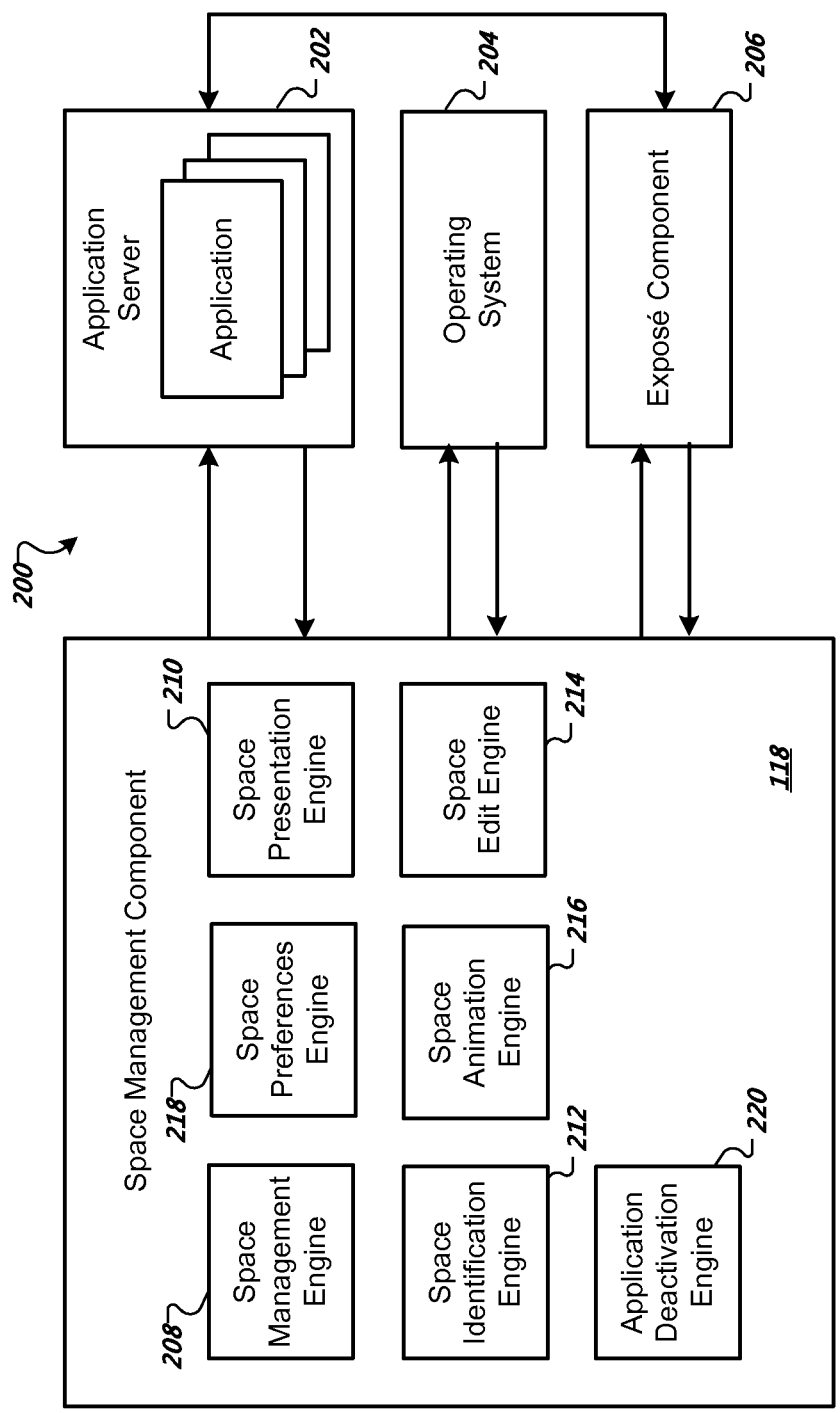
FIG. 2 is a block diagram of an example of an architecture for generation and use of spaces in a display environment.

FIG. 2 is a block diagram of an example of an architecture for generation and use of spaces in a display environment. The space management component 118 is here shown as interfacing with an application server 202, an operating system 204 and an Exposé component 206. Examples of these interactions will be described. In other implementations, other units can interact with the component 118.

The space management component 118 can have engines for handling tasks such as space management, preferences, presentation, identification animation and editing, as well as application deactivation. A space management engine 208 can manage the other engines in the component 118 or components thereof. A space presentation engine 210 can handle how spaces are presented on a computer display. A space identification engine 212 can handle identification of the application program(s) associated with each space. A space edit engine 214 can handle tasks which involve reordering, adding, or removing spaces within a space group or moving application windows within or among workgroups. A space animation engine 216 can be used, for example, to handle fade in/out transitions or movement of spaces and application windows. A space preferences engine 218 can handle information about user preferences for matters such as the assignment of programs to spaces, space editing, transition details, etc. An application deactivation engine 225 can handle deactivating applications; for example, the engine 225 can be used for turning off streaming video when the corresponding space is not active on the user interface.

In the example shown in FIG. 2, the operating system 204 provides resources to the space management component 118 such as task execution, memory, application window IDs, etc. The component 118 uses these resources, as applicable, in generating and using spaces. The application server 202 can communicate with the space management component 118 and the Exposé component. The application server can serve one or more applications for presentation in windows on the display device. Certain operations can be performed on these windows using the space management component 118 or the Exposé component 206.

The Exposé component 206 is a well-known feature available from Apple Computer in Cupertino, CA. For example, the Exposé component 206 provides that a user can trigger tiling, scaling or arrangement of open windows to increase usability. For these or other purposes, the Exposé component 206 can communicate with the space management component 118 and the application server 202 to coordinate application window presentation.

A number of discrete portions of the space management component 118 have been described in this example. Fewer than all of the portions can be used in an implementation. Also, two or more of the components can be combined into a single unit.

Figure 3:
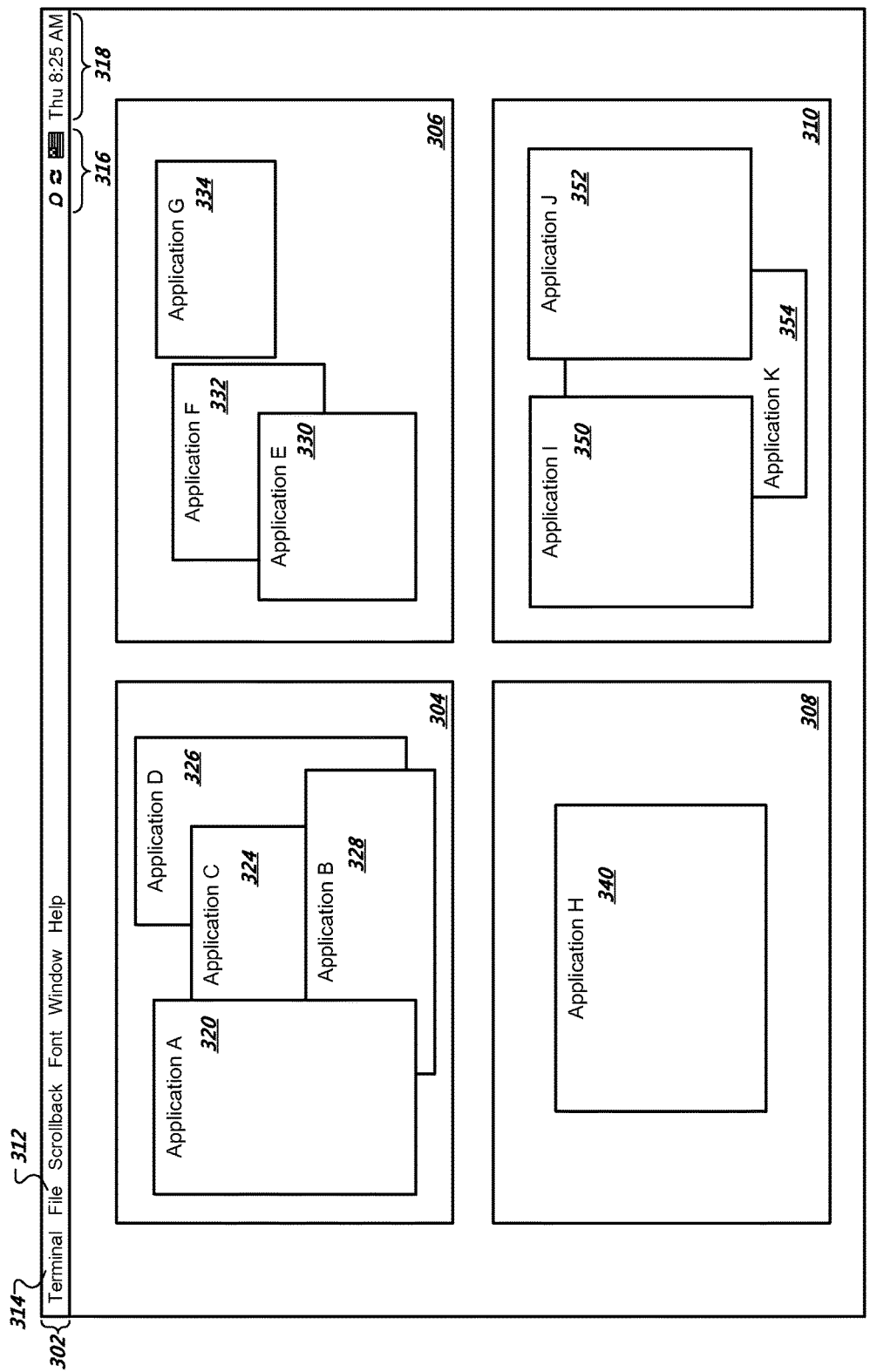
FIG. 3 depicts a screenshot of a computer display showing spaces being presented in a desktop view.

FIG. 3 depicts a screenshot of a of a computer display showing spaces being presented in a desktop view. The depiction includes elements which can be found in a display 300 of a graphical user interface and space elements, here a toolbar 302 and several spaces (304, 306, 308, 310).

Toolbars provided by applications or the operating system can be shown on the display 115. The toolbar 302 can include items such as menus, icons, and informative objects. Some menus can be general and not specific to a particular application, such as a file menu 312. Other menus can be application dependent, such as a terminal menu 314, in which case they can be added to or removed from the toolbar depending on whether a corresponding application window is active. Icons 316 can be used to present information to the user, such as status information, and/or can be used to access functions via, for instance, popup menus or commands for opening another application window. Informative objects present in the toolbar can display items such as the time or day of the week 318.

A computer display with multiple spaces is shown in space view mode, including a first space 304, a second space 306, a third space 308, and a forth space 310. The spaces in the matrix show portions of a larger desktop which may be zoomed, for instance, to show more detail. In zoom mode, a single space can be active and presented with a larger size, with the other spaces not being visible. The spaces represent a desktop surface larger than what can be shown on display at once. Thus, application windows are depicted in reduced size to be able to show all.

In one implementation, the spaces are defined in an addressable N×M matrix of screen content. For example, the matrix can be N spaces tall by M spaces wide; if the matrix of content were displayed at full resolution as a single image, the image would have a pixel height larger than the pixel height of the computer screen and a pixel width larger than the pixel width of the computer screen. All or some of the matrix can have content assigned to it, and a corresponding portion of the matrix can be rendered as screen output when that space is active. Thus, the content assigned to one space is presented within the screen ranges of height and width, but this content could be merely a fraction of the windows that are currently open and distributed in the N×M matrix. In FIG. 3, there is shown an overview of the spaces 304-310 where they are rendered in sizes that allow them to be displayed all at once.

A desktop larger than what can be simultaneously be displayed on the screen, as mentioned above, is one example of how the space component 118 can implement and handle spaces. In such an implementation, any individual space that is active and presented on the screen can correspond to a portion of that large desktop being selected for display. Another example of how the space component 118 can operate is that there is defined layers for the individual spaces such that any or all layers can be activated to generate a desired output. For example, the switching from one space to another can then correspond to deactivating one layer and activating another. In such an implementation, the available desktop area can nominally be of the same or similar size as the displayable area, but the respective layers can be individually addressed and displayed.

Each space can have one or more application windows associated with it. Applications can be local or served from an application server and correspond to one or more associated application windows which appear on the display 300. For example, the first space 304 has a program window 320 corresponding to an application A, a program window 322 corresponding to an application B, a program window 324 corresponding to an application C, and a program window 326 corresponding to an application D. A second space 306 has a program window 330 corresponding to an application E, a program window 332 corresponding to an application F, and a program window 334 corresponding to an application G. A third work space has a program window 340 corresponding to an application H. A fourth space has a program window 350 corresponding to an application I, a program window 352 corresponding to an application J, and a program window 354 corresponding to an application K. The assignment of one or more application windows to each space can be handled by the space identification engine 212. The distribution of the spaces (304, 306, 308, 310) can be governed by the space presentation engine 210. An application may have a default space specified using preferences engine 218 such that the application's program windows initially appear in the default space, Once program windows appear, they may be reorganized, such as by placement into a different space. Below, there will be described an example showing that a window or application can be defined as "sticky", meaning that it is automatically assigned to all of the spaces and will appear when each of them is active. Programs or windows can be automatically made sticky by default; as one example, a program window for a chat application can be automatically made sticky so that it is visible in all spaces.

One or more application windows can be arranged in multiple ways within a space. Application windows can be positioned such that they can fully or partially overlap one another. They can be resized or moved around in spaces to accommodate the user. Particularly, while many windows can be open at once and distributed among the spaces, in some implementations only the application window(s) in a particular space will be visible when that space is active. In some instances, programs or windows from another space can be visible; for instance, a small representation of another space can be visible on the display to achieve a "picture-in-picture" effect. In some cases, an application or window can briefly appear even if its space is not being displayed; for example, some events such as finishing a task can cause a program window to appear for a limited time or until a user dismisses the window.

Within a given space, a program window can be designated as an active program window. The term "active program window" refers to a program window which is currently designated as the primary recipient of user input for input devices such as a keyboard. The user, or a component such as the operating system, can cause a different program window to be designated as the active program window within a given space. Each space can have one program window that is active when the space is being displayed; in some implementations, when a different space is displayed, its designated program window becomes active. For example, if the program window 320 associated with application A is designated as the active program window for the first space 304 and the program window 330 associated with application E is designated as the active program window for the second space 306, the program window 320 can be active when the first space 304 is active and the program window 330 can be active when the second space 306 is active. In one implementation, the activeness can be independent of the space that is being presented.

In one implementation, the active window for each space is defined as the window that the user most recently interacted with (e.g., clicked on). To save system resources, the application deactivation engine 220 (FIG. 2) can deactivate one or more of the applications in the application server 202 when the respective applications are not active. This can, for example, reduce or eliminate the consumption of network bandwidth and processor capacity by a streaming video application while it is not being displayed. Some implementations can prevent switching to a different space when the currently active application becomes inactive. A process list is a list of all applications, program windows, processes, etc., currently running on the computer that kept by the operating system. In some implementations, the order of the list can be reshuffled so that higher-priority items appear near the beginning of the list, with the active application appearing first. Events, for instance the closing of the active application, can cause the operating system to designate the next application in the list as active and place it at the beginning of the process list. The list of currently running applications can be reordered when a space is viewed so that applications associated with program windows in the space are placed near the beginning of the process list and chosen first when switching to a new running application. Applications that can show the process list to the user can be updated with the reshuffled list. For example, the application that is initiated with the command-tab keys can reflect the reshuffled list.

The view mode shown in FIG. 3 allows the user to see what applications/programs are in each space and choose which space to use. When in view mode, applications can continue to run and program windows can be displayed in a normal fashion, for example on a smaller scale. Program windows continue to update, for example, displaying animations, refreshing their contents, etc. In a sense, the view mode shows the :real windows of all spaces. Users can navigate between spaces with appropriate user input, such as by mouse, keyboard hot keys, key combinations, gestures, or other mechanisms. Other devices can also be used for input, such as those for providing alternate input capability for physically handicapped users. It can be possible for the user to zoom in on a subset of spaces. In one implementation, the system can automatically switch from one space to another based on a predefined event, such as when a specific application is launched or an application makes a particular output.

Figure 4:
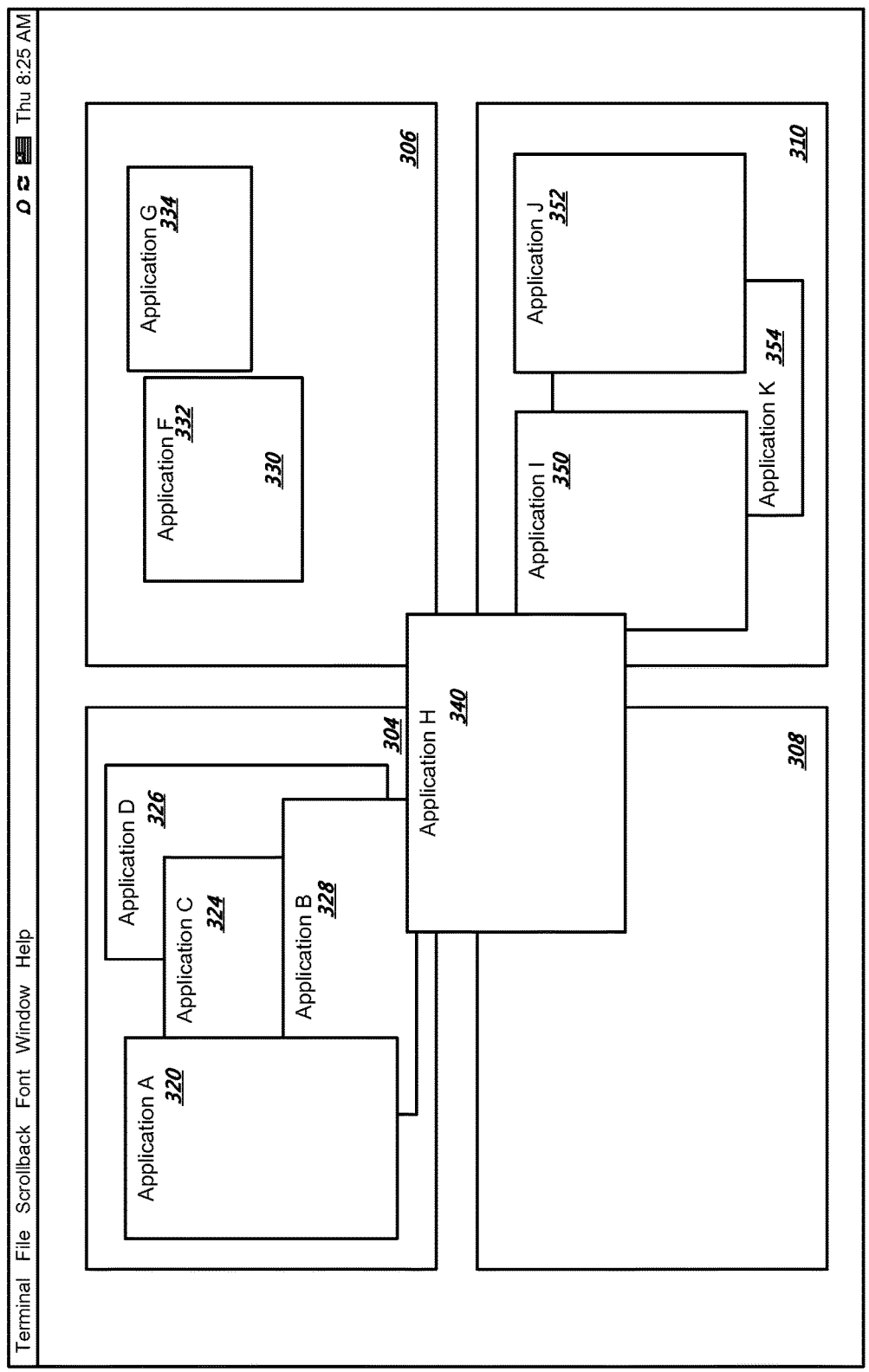
FIG. 4 depicts a screenshot of a computer display showing an application window as it is being transferred from one space to another space in a space management system.

FIG. 4 depicts a screenshot of a computer display showing an application window as it is being transferred from one space to another space in a space management system. This change can be initiated by the user, for example because the application is to be used in connection with the applications(s) already present in that other space. FIG. 4 continues the example introduced in FIG. 3 by showing the program window 340 corresponding to application H being moved from third space 308, in the bottom left, to the second space 306, located in the top the right. In this example, the user starts by opening edit mode, such as by holding a mouse button while pointing to the program window 340 corresponding to application H, or pressing a hot key. The user selects the program window 340 corresponding to application H with the mouse, drags it from the third space 308 and releases it in the second space 306. When finished, the user can resume working by exiting edit mode via another hot key or mouse gesture, or perform other application window moves. In some implementations, the component 118 exits edit mode automatically upon the move being completed. While the above example describes a single window being moved, other moves are also possible in some implementations. For example, it can be possible to move all windows of a type, all windows of a single application, or a selection of windows. In some implementations, some changes to spaces, such as moving content from one space to another, can be done in view mode or a zoom-in mode; that is, without formally entering edit mode.

The user can signal his or her intentions to transfer an application window using a menu, icon, popup menu, gesture, hot-key or key combinations, to name some examples. The application window to be moved can be selected, in some implementations, via mouse clicks or gestures, combinations of button presses such as tabs or arrows, or combinations thereof. Various methods of moving the application windows can be used, such as by using a mouse to drag the application window from the originating space and drop it into the destination space, or using keyboard commands to reposition the application window into the destination space. The space presentation engine 210 can register the relocation of the application window and alert the space identification engine 212 about this change. For example, the space identification engine 212 can make sure that this change is preserved for the next time the display 300 is initiated.

Figure 5:
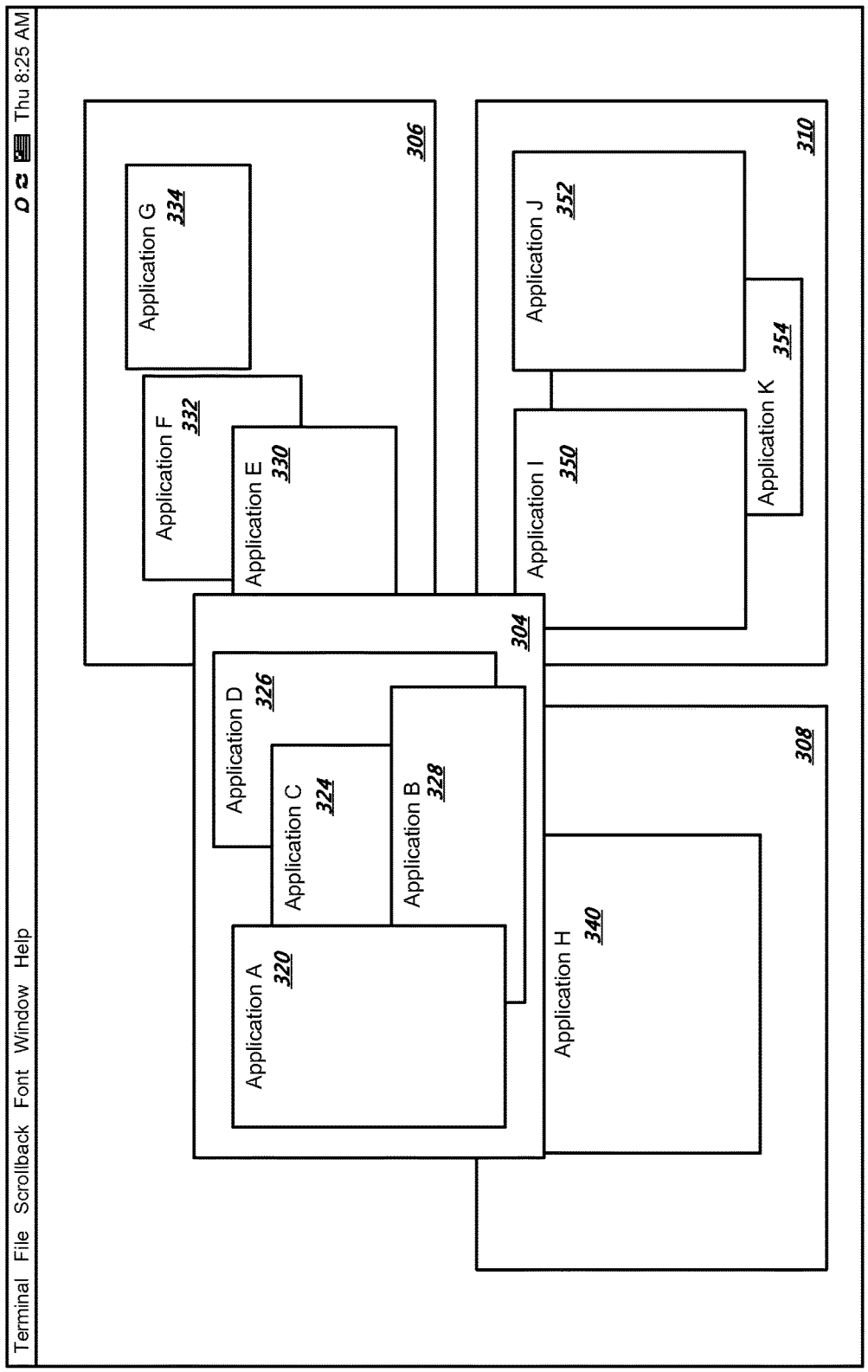
FIG. 5 depicts a screenshot of a computer display showing a space being rearranged.

FIG. 5 depicts a screenshot of a computer display showing a space being rearranged. The figure shows an example of using a space edit mode to move the first space 304 depicted in FIG. 3 to a new position. In this example, the first space 304 is being moved from the top-left position of the space group to the bottom-right position.

While in space edit mode, spaces can be arranged in a plurality of ways to suit the user. The process of arranging spaces can be done in a similar fashion to the process used for moving program windows. For example, the user can signal his or her intention to move a space via a menu, an icon, a popup menu, a mouse gesture, a hot-key, etc. The space to be moved can be selected, in some implementations, via mouse clicks or gestures, combinations of button presses such as tabs or arrows, or combinations thereof. Various methods for moving application windows can be used, such as using keyboard commands or using a mouse for dragging the application window from one space and dropping it in another space.

When a space is moved to a new position the space presentation engine 210 determines whether that position is already occupied by another space. If so, that other space can be relocated to make room for the moved space. Also, the relocated space or one or more other spaces can be adjusted to fill the vacated space position. In some implementations, the space being displaced is moved to the position of the one taking its place; for example, when the first space 304 is moved to the bottom-right position of the space group, the fourth space 310 moves to the vacated position in the top-left position. In some implementations, other repositioning schemes can be used, such as sliding a bordering or adjacent space vertically or horizontally to fill the void or shuffling the spaces in a clockwise or counter-clockwise direction. For example, in implementations where the multiple spaces are defined in a desktop area that is larger than the displayable area, the relocation of one or more spaces can correspond to a corresponding reorganization of the desktop area.

In some implementations, a user can specify a preferred way to handle space movements. For instance, in the preceding example, the space preferences engine 218 depicted in FIG. 2 can be used to specify moving details such as whether swapping, sliding, or shuffling occurs to fill a vacancy. The space animation engine 216 can provide animated motion of one or more spaces during editing.

Figure 6:
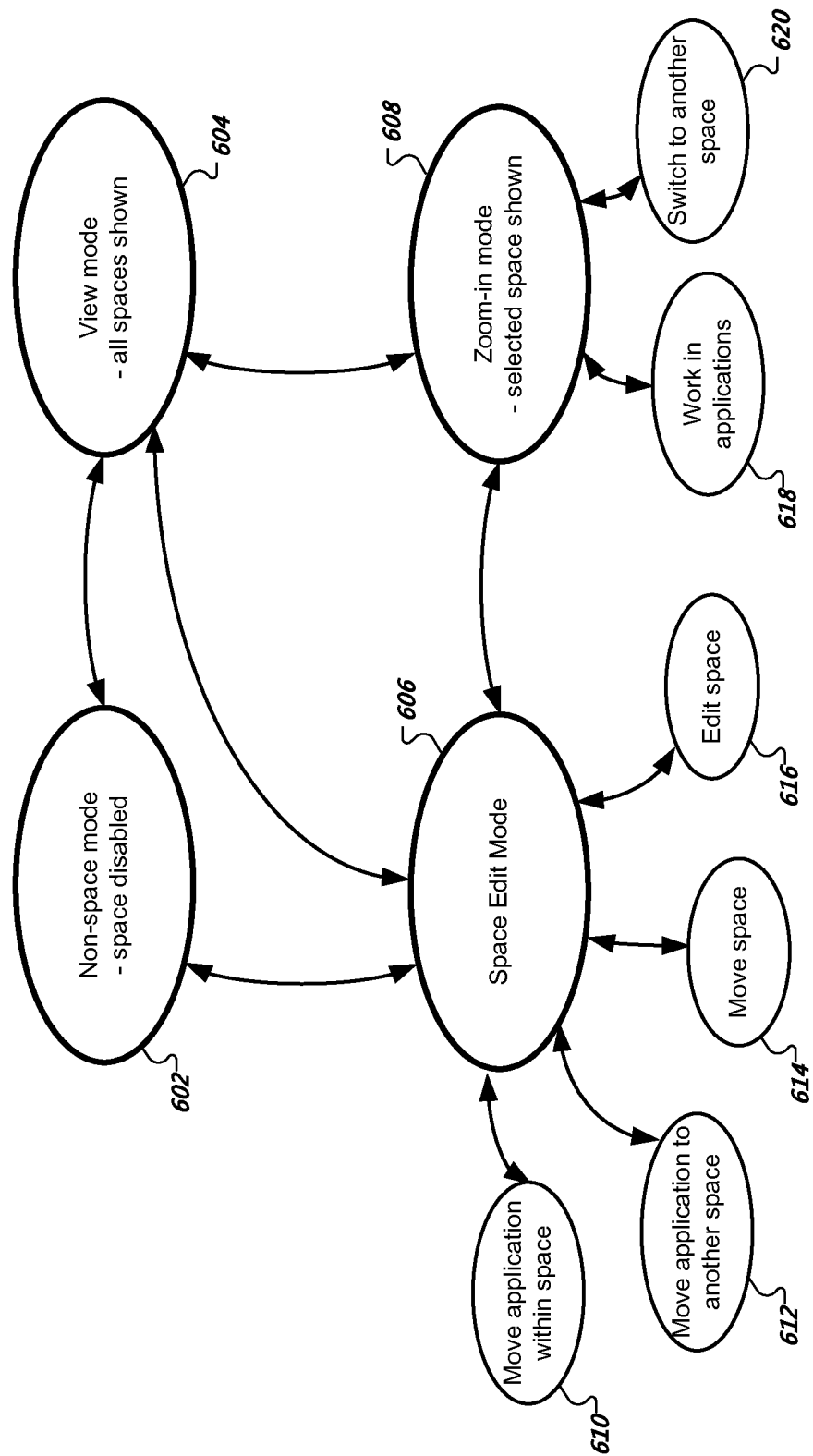
FIG. 6 schematically shows exemplary modes of operation for managing spaces.

FIG. 6 schematically shows exemplary modes of operation for managing spaces. The space management system can be in one of several modes to perform various space-related functions. Users can switch between the modes to access various types of associated functionality and some transitions can be automatic.

The system can include modes such as a non-space mode 602, a view mode 604, space edit mode 606, and a zoom-in mode 608. The various modes (602, 604, 606, 608) can provide a user with one or more associated functions for managing spaces. The various modes (602, 604, 606, 608) and associated functions can be activated using input devices such as a keyboard or mouse to change from one mode to another.

While in the non-space mode 602, spaces are disabled and the system provides access to one or more application programs without displaying spaces, e.g., all non-minimized program windows are displayed. Following the above example of FIG. 3, non-space mode 602 can cause the program windows (320-354) corresponding to all of the applications A-K to be shown simultaneously on the display. Depending on the screen size, this may require stacking some or all of the program windows (320-354) on top of each other. If so desired, a user can signal to the space management engine via, for instance, a hot key or toolbar icon to change from the non-space mode 602 to view mode 604 or to space edit mode 606.

When the system is in view mode 604, all configured spaces are displayed by the system, for example in a grid of spaces. View mode functionality can be considered a "zoom-out" perspective compared to the zoom-in mode 608, where a single space is shown. From the view mode 604, the system can enter the non-space mode 602, the space edit mode 606, or the zoom-in mode 608.

The space edit mode 606 provides space editing functionality. One edit function 610 can provide the user with a capability to move an application window within a space. A second edit function 612 can provide the user with a capability to move an application window from one space to another space. A third edit function 614 can provide the user with a capability to rearrange spaces. A fourth edit function 616 can provide the user with a capability to edit a space, for example to add a new application window to the space or to remove an existing one. The space management engine 208 can add more spaces when requested by the user. A plurality of edit functions can be performed while in the space edit mode. From the space edit mode 606, the system can enter the non-space mode 602, the view mode 604, or the zoom-in mode 608. The space edit engine 214 can provide these or other functionalities in the edit mode. As noted above, some edits or changes can be done also when not in edit mode.

When in the zoom-in mode 608, one or more selected spaces can be shown on the display. When the space 306 (FIG. 3) is active, for example, the program windows 330-334 are shown on the screen. In some implementations, the appearance of the program window(s) in the zoom-in mode is very similar or identical to how they look in the non-space mode 602. One difference, however, is that in the zoom-in mode any other program windows kept inactive in the other spaces can be considered as resting outside the currently visible area of the desktop. This contrasts with the non-space mode 602, where any currently running application has its program window(s) shown (either in a minimized or non-minimized form). In some implementations, the use of spaces is a way of dividing a large view so that it can be viewed and accessed in smaller portions.

From the zoom-in mode 608, several associated functions can be used. A first function 618 can provide the user with a capability to work with their application windows. For example, the user interacts with the currently active program window. A second function 620 can provide the user with a capability to switch to another space. Because the spaces collectively correspond to more screen space than can be presented at once, the switching function 620 provides a convenient management of contents when there are several open program windows. From the zoom-in mode 608, the system can enter the non-space mode 602, the view mode 604, or the space edit mode 606.

Figure 14:
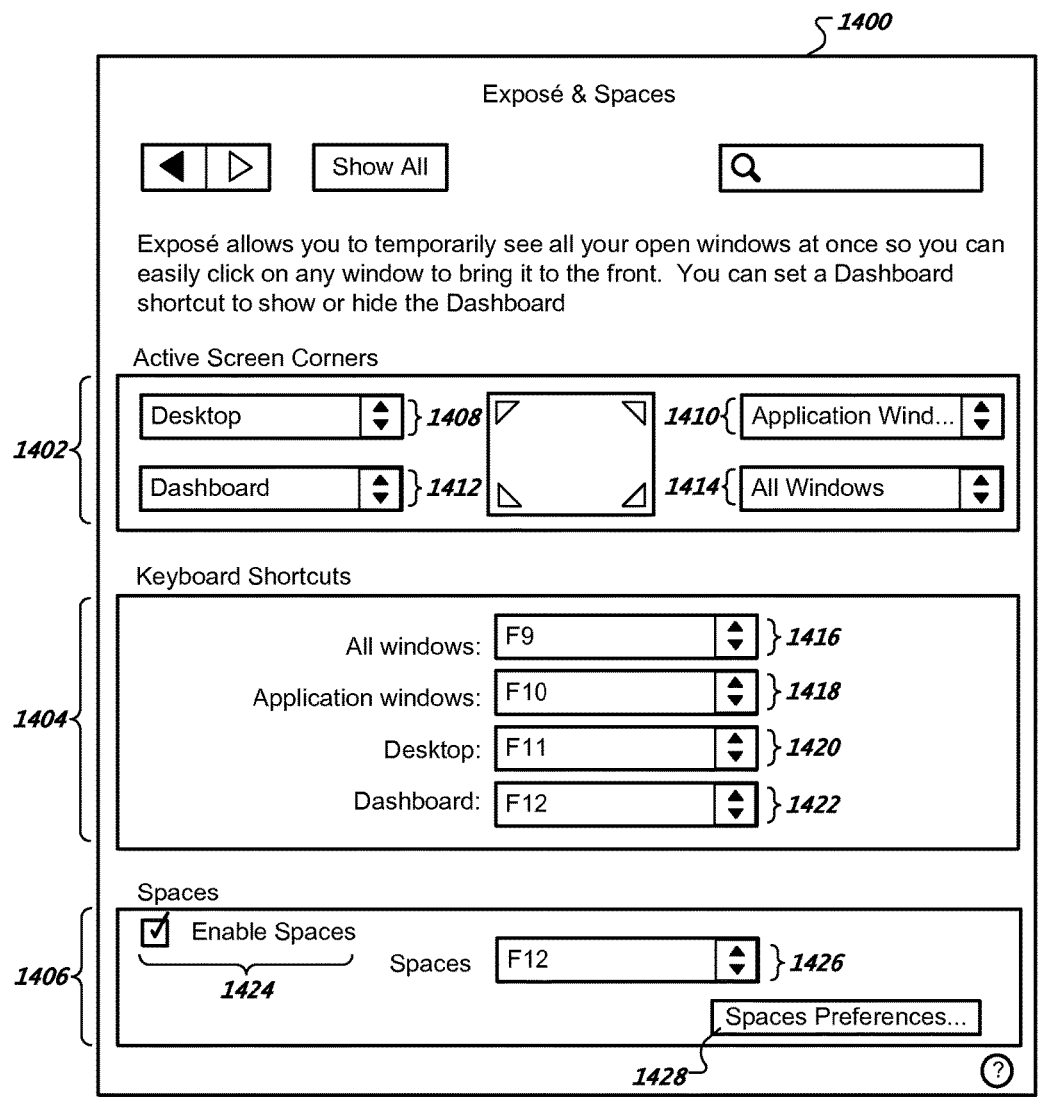
FIG. 14 depicts a configuration window for specifying preferences related to Exposé and spaces.

In some implementations, such as depicted in FIG. 14 (described later in more detail), the choice of which mode to begin with, after a restart for example, can be configurable. User preferences can be tracked by the space preferences engine 218 to determine, for instance, which mode to use when the system is initialized.

Figure 7:
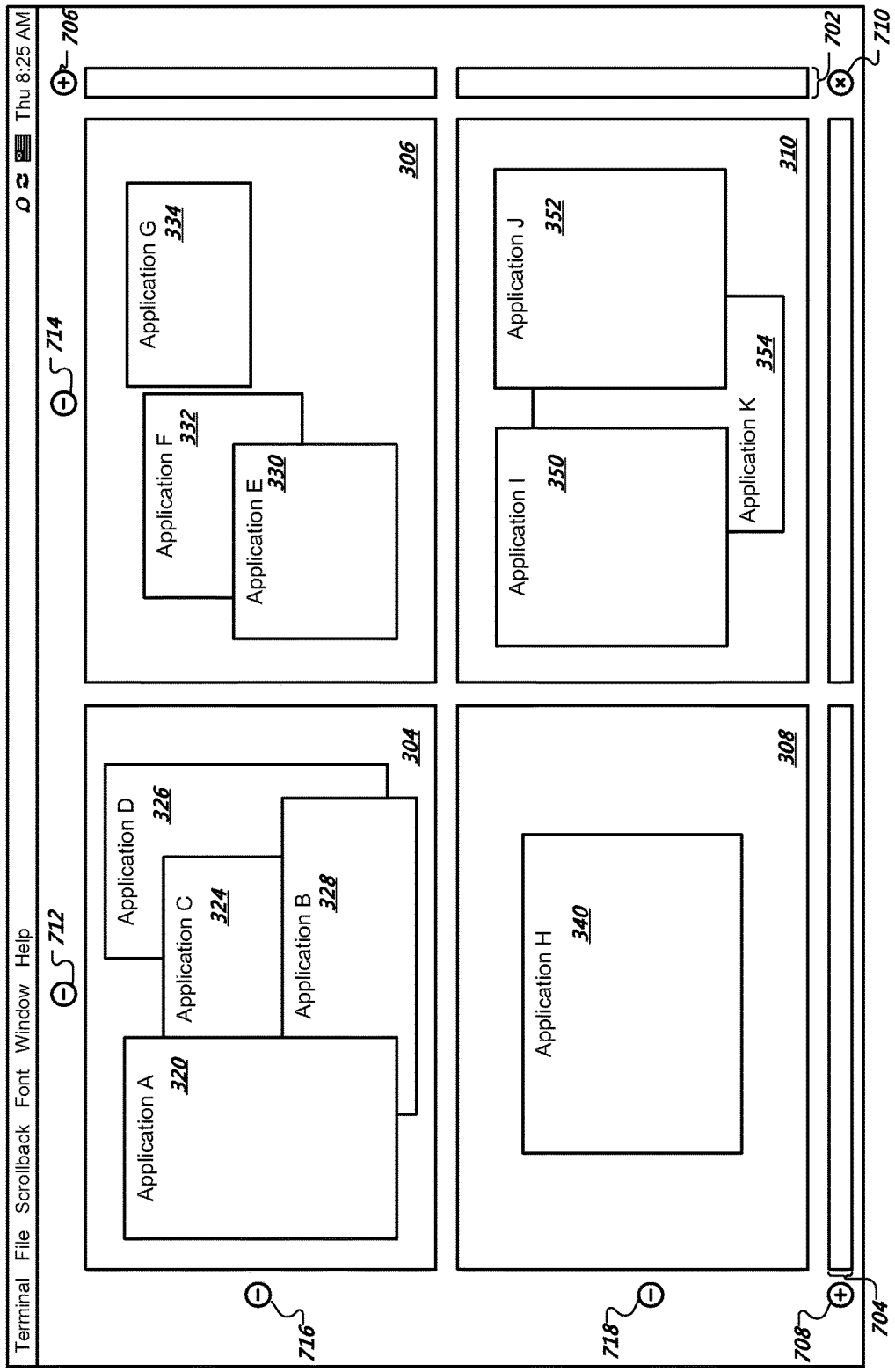
FIG. 7 depicts a screenshot of a computer display in space edit mode showing controls for adding or removing spaces.

In the space edit mode 606, a user can change the number of spaces available for use in the system. In some implementations, the number of available spaces may be changed by adding or removing rows or columns of spaces. FIG. 7 depicts a screenshot of a computer display in space edit mode showing controls for adding or removing spaces. Icons and placeholder spaces are used to control and indicate adding or removing rows or columns in the group of spaces depicted in the example of FIG. 3. The user may add or remove columns or rows of spaces, for example by clicking on an icon or using a hotkey. Space(s) remaining after a deletion can be shifted horizontally or vertically to fill the void left by the deleted space(s).

In FIG. 7, a column 702 is located on the right side and a row 704 is located at the bottom of the spaces (304, 306, 308, 310) depicted in FIG. 3. Each of the column 702 and the row 704 includes placeholder spaces representing the possibility of adding spaces in the respective directions. An icon 706 above the column 702 can be used to add one or more columns of spaces. An icon 708 next to the row 704 can be used to add one or more rows of spaces. An insertion icon 710 located in the bottom-right corner of the space group can be used to simultaneously add a row and a column of spaces to the space group. Column deletion icons (712, 714) located above the spaces (304, 306, 308, 310) can be used to delete a column of spaces e.g. clicking on the left column deletion icon 712 causes the spaces (304, 308) in the left column to be deleted. Row deletion icons (716, 718) located to the left of the spaces (304, 306, 308, 310) can be used to delete a row of spaces e.g. clicking on the bottom row deletion icon 718 causes the spaces (308, 310) in the bottom row to be deleted. When the closed space(s) contains one or more program windows, the associated application(s) can be closed by the application deactivation engine 220 or transferred to another space. Such settings can be managed by the space preferences engine 218. Other techniques can be used for arranging spaces, such as arbitrary placement, for example, or arranging three spaces in one row and a single space in another, accompanied by appropriate mechanisms for moving, deleting, and adding spaces.

Figure 8:
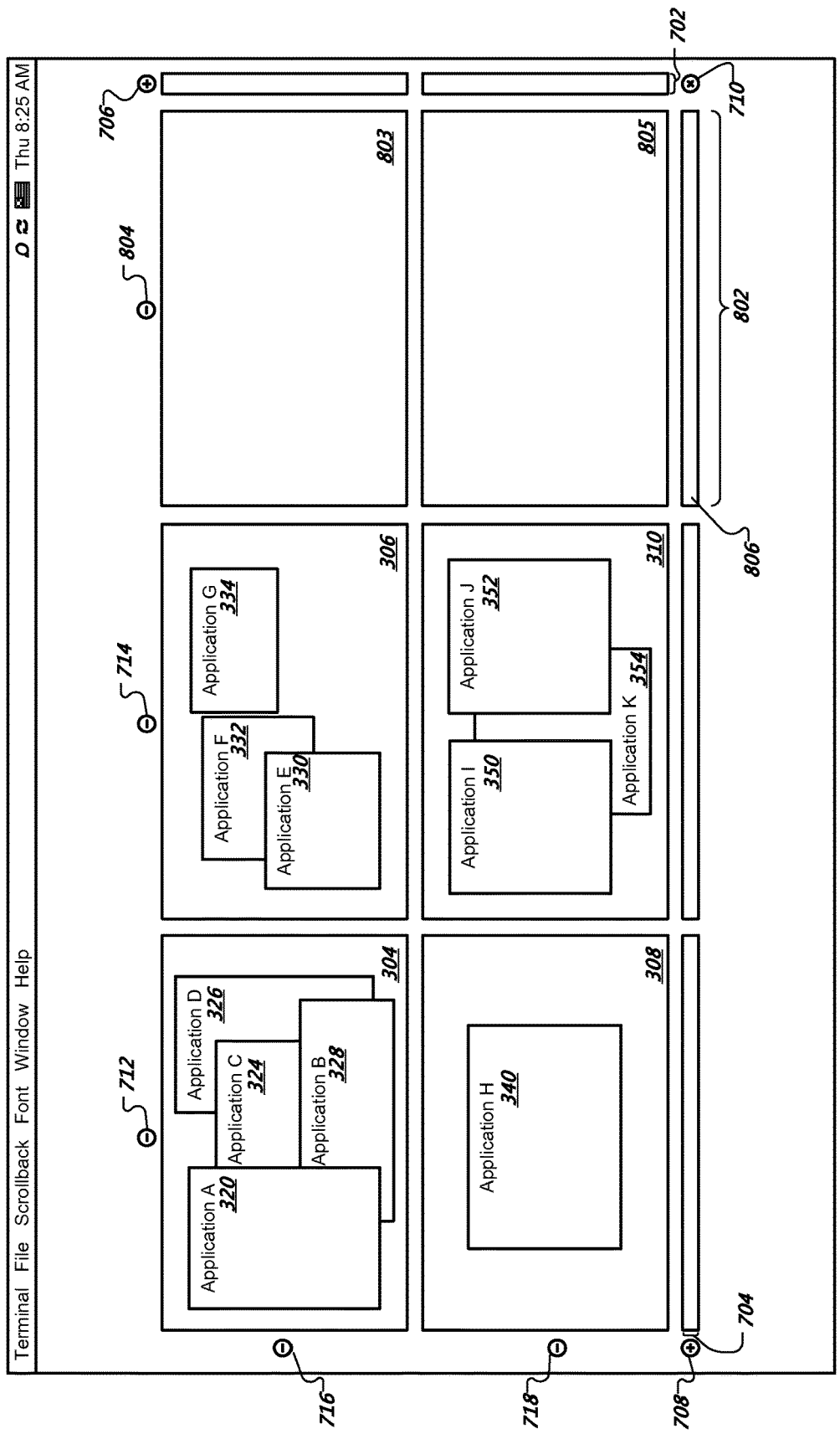
FIG. 8 depicts a screenshot of a computer display of FIG. 7 in space edit mode with an additional column of spaces.

FIG. 8 depicts a screenshot of the computer display shown in FIG. 7 in space edit mode with an additional column of spaces. Starting with the group of spaces (304, 306, 308, 310), a third column 802 of spaces (803, 805) has been inserted to the right if the existing spaces (304, 306, 308, 310) by clicking on the insertion icon 706 above the column 702. An associated removal icon 804 and placeholder space 806 in the placeholder row 704 have also been added. The previously existing spaces (304, 306, 308, 310) have been scaled and shifted to allow viewing of the full group of spaces. The user can now relocate any or all of the currently open program windows to any of the spaces (803, 805).

If the user wishes to remove the third column 802, he or she can click on the removal icon 804 above the column to delete the spaces in that column. When the column is deleted, the remaining spaces can be shifted and zoomed to fill the available space resulting in the original layout depicted in FIG. 7.

Input controls other than the icons described above (e.g., icons 706, 804) can be used. For example, keystrokes, mouse gestures or menu commands can be used to add or remove spaces.

Figure 9:
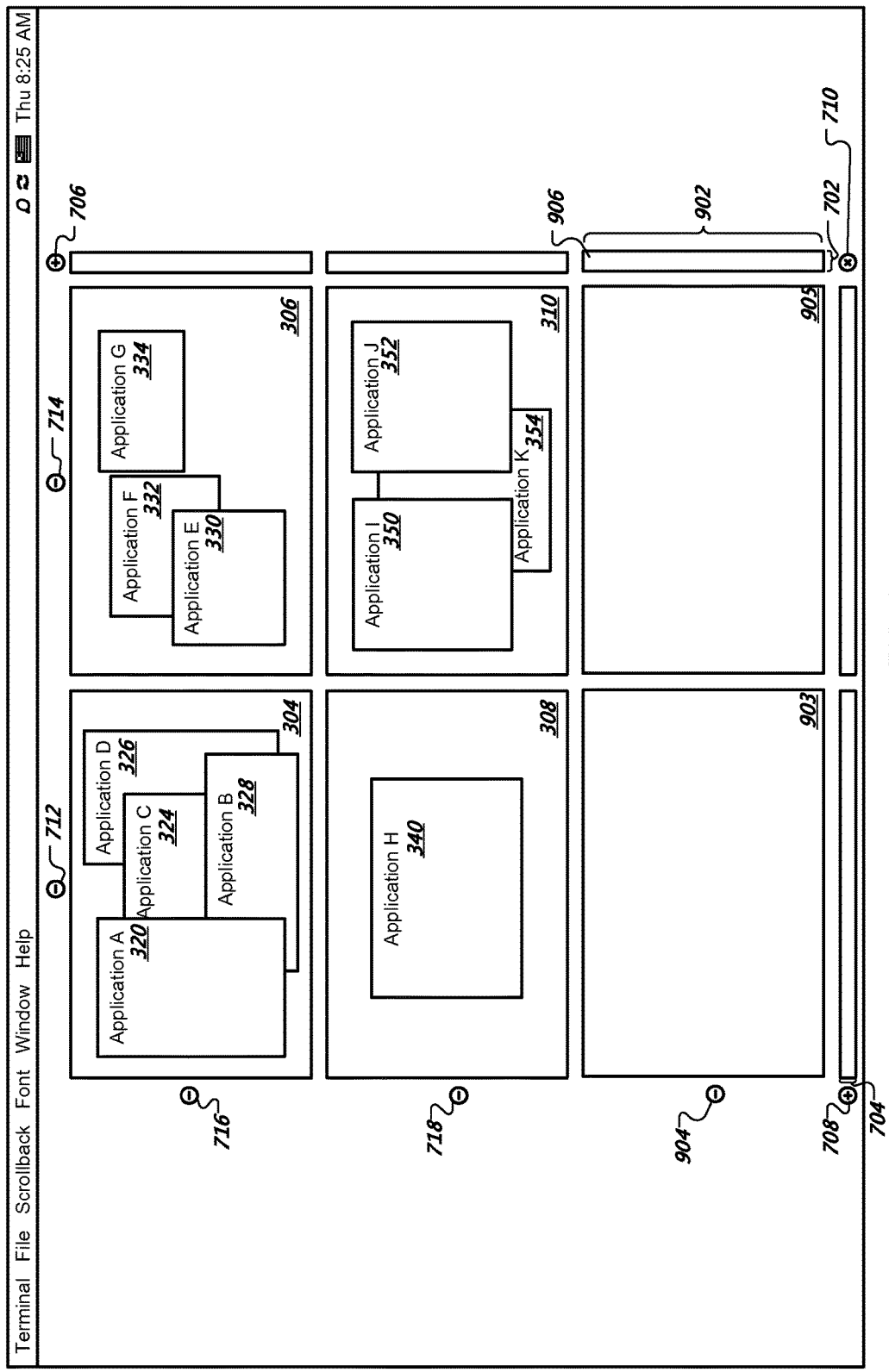
FIG. 9 depicts a screenshot of a computer display of FIG. 7 in space edit mode with an additional row of spaces.

FIG. 9 depicts a screenshot of the computer display in space edit mode shown in FIG. 7 with an additional row of spaces. A third row 902 of spaces (903, 905), as well as an associated removal icon 904 and placeholder space 906 have been added by clicking on the addition icon 708 located next to the bottom row of spaces shown in FIG. 7. Similar to the above example of FIG. 8, the preexisting spaces (304, 306, 308, 310) were scaled and shifted to accommodate the added row 902 of spaces. If the user were to choose to delete the third row 902 of spaces, such as by clicking on its adjacent deletion icon 904, the remaining spaces (304, 306, 308, 310) would be zoomed and shifted downward, resulting in the original layout shown in FIG. 7.

The exemplary operations described with reference to FIGS. 8 and 9 can be registered by the space edit engine 214 and forwarded to the space identification engine 212 to establish the newly created spaces, and to the space presentation engine 210 to generate the updated display, to name one example. It may be noted that the space layouts depicted in FIG. 8 and FIG. 9 could also have been generated upon the user clicking on the insertion icon 710 to add both a row and a column, then deleting either a column or row as appropriate.

In some implementations, the space management component 118 can have the capability to add or subtract single spaces at a time, where the group of spaces can be automatically organized and sized in an aesthetically pleasing manner or to allow viewing of the full group of spaces.

Figure 10A:
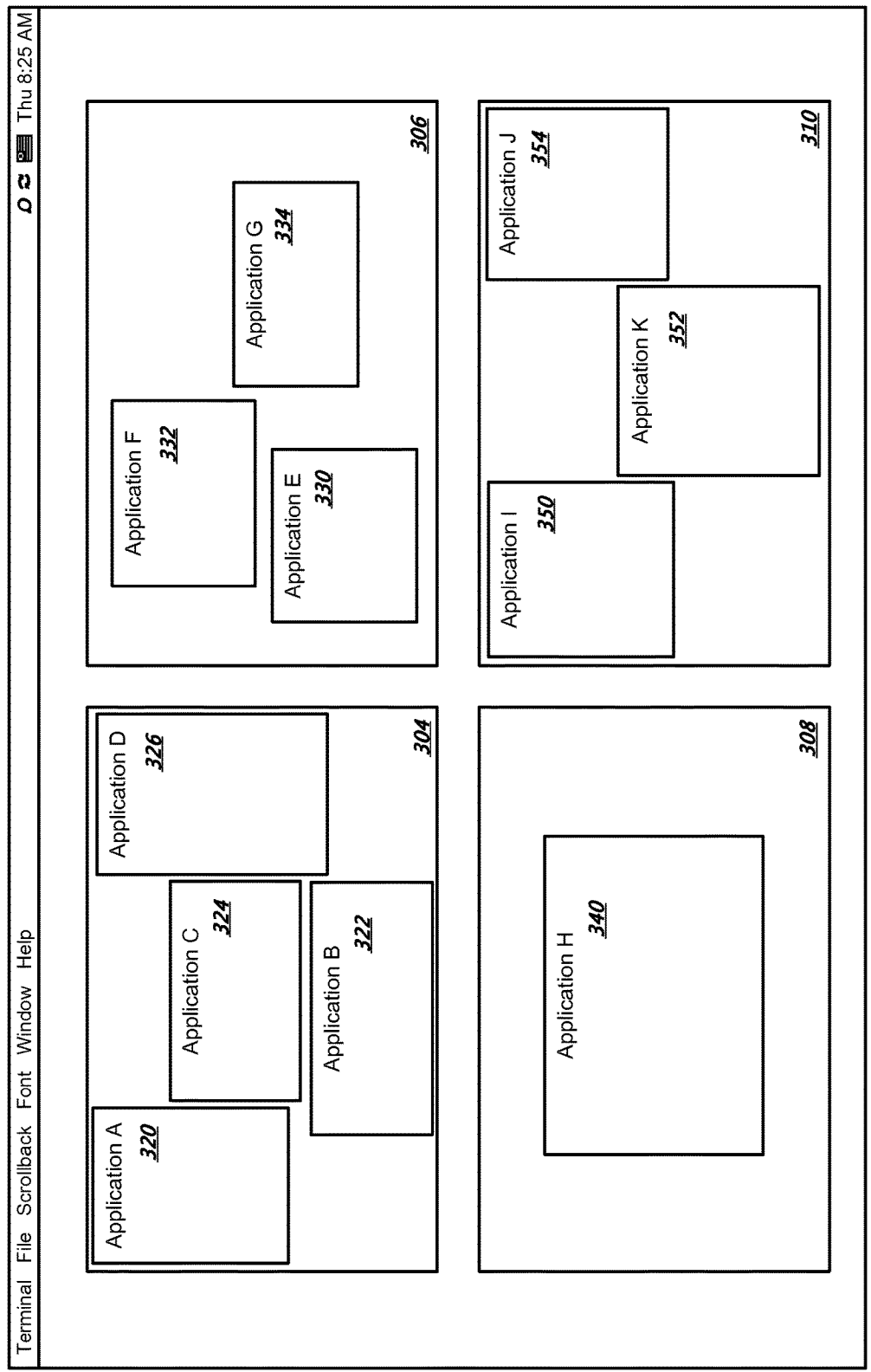
FIG. 10A depicts a screenshot of a computer display showing an example of the display in FIG. 3 after the Exposé component 206 was invoked.

FIG. 10A depicts a screenshot of a computer display showing an example of the display in FIG. 3 after the Exposé component 206 was invoked. The user can, for instance, use a hot key or key combination to command the Exposé component 206 to automatically rearrange, scale, or resize program windows to increase usability. In FIG. 10A, Exposé was used to rearrange the user's program windows to maximize view-ability in all spaces at the same time. It is seen that the windows now overlap less than in FIG. 3. In some implementations, Exposé functionality can be applied to a single space or to multiple spaces.

Figure 10B:
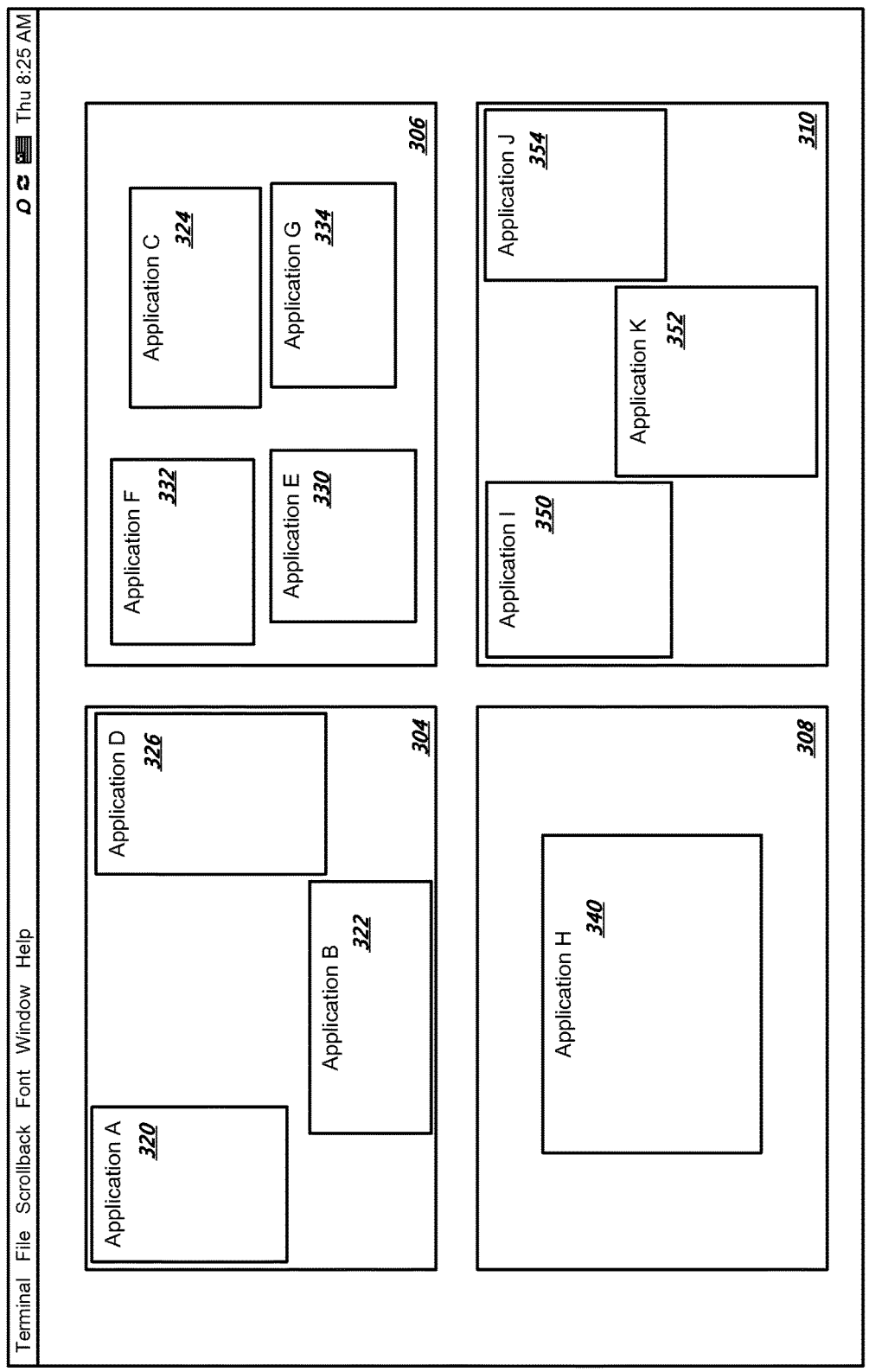
FIG. 10B depicts the contents of FIG. 10A after moving a program window from one space to another.

Exposé components can be automatically invoked when certain events occur. For example, assume that the user, while watching the display of either FIG. 10A or FIG. 3, decides to move the window 324. FIG. 10B depicts the contents after moving a program window from one space to another. In this case, the program window 324 corresponding to Application C was moved from the first space 304 to the second space 306; after the move occurred, the Exposé component 206 was automatically invoked to rearrange the program windows 324, 332, 330, 334 within the space 306. There can also be performed a rearrangement of the windows in space 304; that is, in the space from which the window was removed. These exemplary operations can be performed as a default upon the move, or based on a preference setting to invoke the Exposé component.

It has been described above that the user can switch between spaces, for example to see a window in another space. As another example, the system can automatically switch to a new space upon a predefined event, such as a new window being opened or an existing window moving to the front of the screen. In some implementations, the switch to a new space can be conditioned on one or more criteria. For example, when some windows are initiated they do not imply that a user interface action will occur. The condition(s) can be configured so that such new windows do not automatically cause a switch to a new space. In one implementation, a condition can be set so that windows of one application type trigger a switch while windows of another type do not (e.g. in some implementations, error notifications can cause a switch, where email or chat notifications do not). For example, these operations can be done by the space management component 118.

Figure 11:
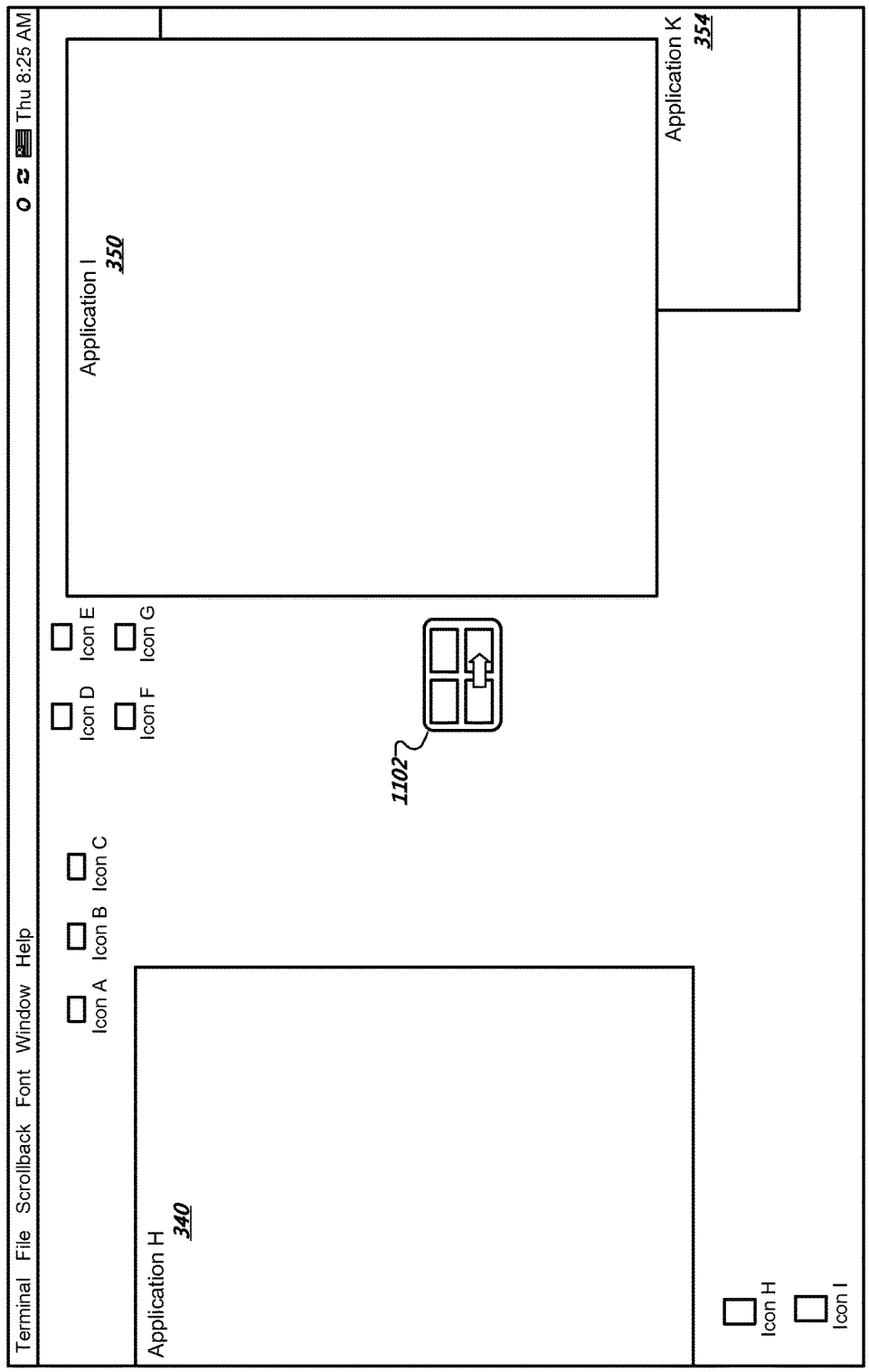
FIG. 11 depicts a screenshot of a computer display in zoom-in mode 608 as the current space is replaced with another space using an animation technique.

In some implementations, the switch is done substantially without animation; for example, the system ceases to display the contents of the previous space and simultaneously, or shortly thereafter, begins displaying the contents of the new space. In another implementation, the switch can include some animation, for example as will now be described FIG. 11 depicts a screenshot of a computer display in zoom-in mode 608 as the current space is replaced with another space using an animation technique. With reference briefly to FIG. 3, the animation technique shown in the current example is performed from the bottom left space 308 to the bottom right space 310. In some implementations, the user makes an input (e.g., with a hot key or a link) that identifies another application window that is to be activated. If the system determines that the sought window is located in the same space that is currently active, there is no need to switch spaces. If, on the other hand, the system determines that the window of the sought application is located in another space, the system can initiate that space, for example using the animation technique.

While viewing one space, the user can change to another space without first changing to view mode. In some implementations, a user can change to an application residing in a space other than the current space, causing the other space to becomes the active space. When a command, such as a hotkey, is issued, the program windows of the space which is currently displayed are gradually removed, replaced by program windows of another space. The transition can be done using an animation technique that moves the contents of the current space out of view while moving the contents of the new space.

In some implementations, the user can use a hot key, etc. to select a space different than the currently active space and thereby trigger the animation technique. For instance, a hotkey may be associated with each defined space or hotkeys can exist that cause an animated move to the next space in the space group. In one implementation, the animation technique can involve the use of an icon 1102 which represents the contents of the respective spaces. Here, the icon 1102 has four sectors for the spaces 304-310. The user can initiate a move to a new space, optionally involving the animation technique, by clicking on the icon corresponding to the desired space.

After a new space is chosen, in one implementation, the application windows of the previously active space gradually disappear and are replaced by the application windows of the newly active space. The transitions can be made in such a manner that the application windows of the previously active space appear to slide toward the edge of the display and the application windows of the newly active space appear to slide into the display. The direction of slide can be indicative as to the relative placement of the spaces when viewed in editing mode. For example, FIG. 11 depicts an animation performed from the bottom-left space to the bottom-right space shown in FIG. 3.

FIG. 11 depicts a an animation technique in progress as the third space 308 is replaced by the fourth space 310. Initially, the program window 340 is shown on the display in a location corresponding to the situation in FIG. 3 (centered in the display area). When a hotkey is pressed, the program window 340 is slid toward the left edge of the display and replaced by the program windows 350, 352 corresponding to applications I and J as the fourth space slides into view (the program window 354 corresponding to application K is not yet in view in FIG. 11). When the animated move is done, the windows 350-354 may be located as indicated in FIG. 3 (window 354 placed in the center, somewhat lower than the others, and the windows 350 and 352 side-by-side on top of, and somewhat higher than, the window 354). Animated move operations can be performed between any two spaces in the current example and in any other space configuration.

Figure 12:
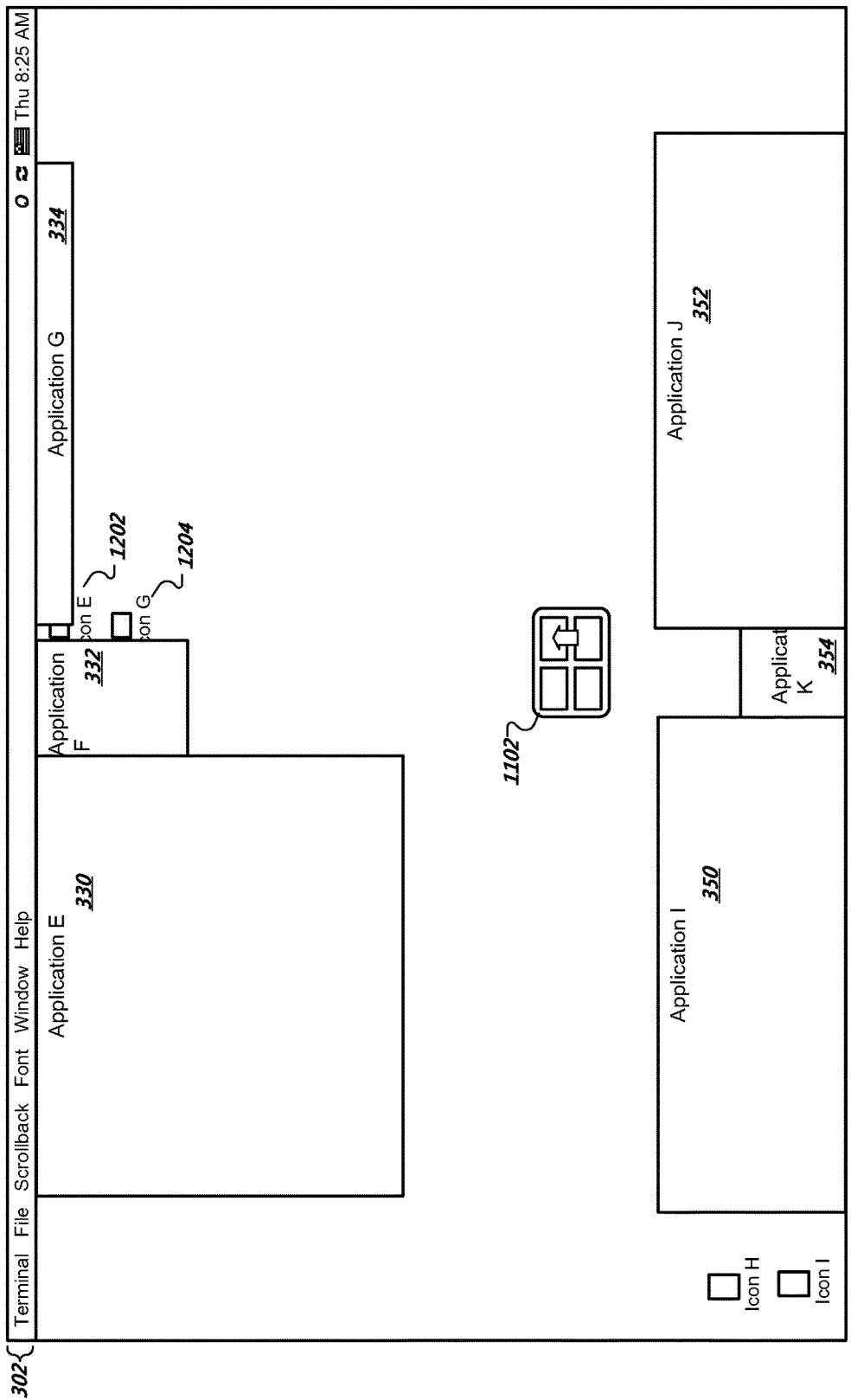
FIG. 12 depicts a screenshot of a computer display in zoomed-in mode as the viewable space is exchanged for a vertically adjacent space using an animation technique.

FIG. 12 depicts a screenshot of a computer display in zoomed-in mode 608 as a viewable space is exchanged for a vertically adjacent space using an animation technique. In FIG. 12, the animation technique is shown starting zoomed in on the fourth space 310 (FIG. 3) and transitioning to the second space 306 (FIG. 3).

In this example, the icon 1102 shows that the animation technique is performed from the space in the bottom-right position to the top-right position space of the space group. The program windows 350, 352, 354 corresponding to applications I, J, and K of the fourth space 310 are shown sliding toward the bottom edge of the display while the program windows 330, 332, 334 corresponding to applications E, F and G of the second space 306 are shown sliding down from the top of the display.

In some implementations, the sliding effect may give the illusion of layers, such as by having the transitioning program windows slide "over" the top of some desktop components while sliding "under" other desktop components. For example, desktop icons 1202, 1204 and the toolbar 302 are not part of the space configuration and the program windows of the second space 306 can be shown sliding on top of these items.

It has been mentioned above that contents can be selectively assigned to any or all of the spaces. A space that has no contents assigned to it can be considered an empty space, but can nevertheless exist together with the other spaces, for example as a placeholder for receiving content at some future time. When activating this space, the user will see that it is empty because there are no windows or applications associated with it. In some implementations, a notification can be generated that the currently presented space is empty. For example, a message such as "Empty Space 5" can be shown on the screen. By contrast, if the user switches to a space that has contents, the user can see the contents of that space, for example as they are brought onscreen using an animation.

Another situation when the space can seem empty to the user is when the content that is assigned to the space is not currently visible. While the appearance may be similar to the "empty space" described in the previous example, there is a significant difference in that the space here actually has a content, although that content is currently not shown.

As a first example, the content can be non-displayed because the application associated with the space is not currently running A second example is that the application is running but is not currently generating any output (e.g., the application does not have a window open in the user interface). A third example is that the window generated by the application has been minimized or closed. Such non-visible content can be a problem for the user in some situations, because the user can mistakenly believe that the space does not have any contents.

Any of several approaches can be used with spaces that have content but where the contents are currently not displayed. First, the space management component 118 can provide that a command bar associated with the application(s) is nevertheless displayed. For example, in a Mac operating system the Dock tiles for the associated application(s) can be shown. Second, there can be presented a heads-up display image, such as a floating control window, associated with the application(s). Particularly, assume that the contents of the space 308 shown in FIG. 3 were not currently displayed. Upon detecting this, a heads-up display for the application H could be displayed, which can appear similar to the here schematically illustrated window 340 that is currently visible. Third, the background of the space can be branded with the application(s). For example, this can be done using recognizable elements associated with the application, such as a logo, an audio track, or an advertising theme. Particularly, the branding can for example appear similar to the here schematically illustrated window 340 that is currently visible. Combinations of the above can be used. The above exemplary approaches, and other approaches as well, can be done by the space presentation engine 210, optionally in association with the space animation engine 216.

In some implementations, the indications of non-displayed content can be moved between spaces. For example, a user can select the indication in one space and drag it to another space. This can be done in any context where the indication is present, including in an Exposé-style display of spaces, such as the one shown in FIG. 10B. For example, the indication can be dragged to a "hot edge", a feature that will be described below with reference to FIGS. 19A-C. The relocation of the indication triggers the associated application(s) to be reassigned to the other space. The moving and reassignment can be handled by the space presentation engine 210 in connection with the space identification engine 212.

Figure 13:
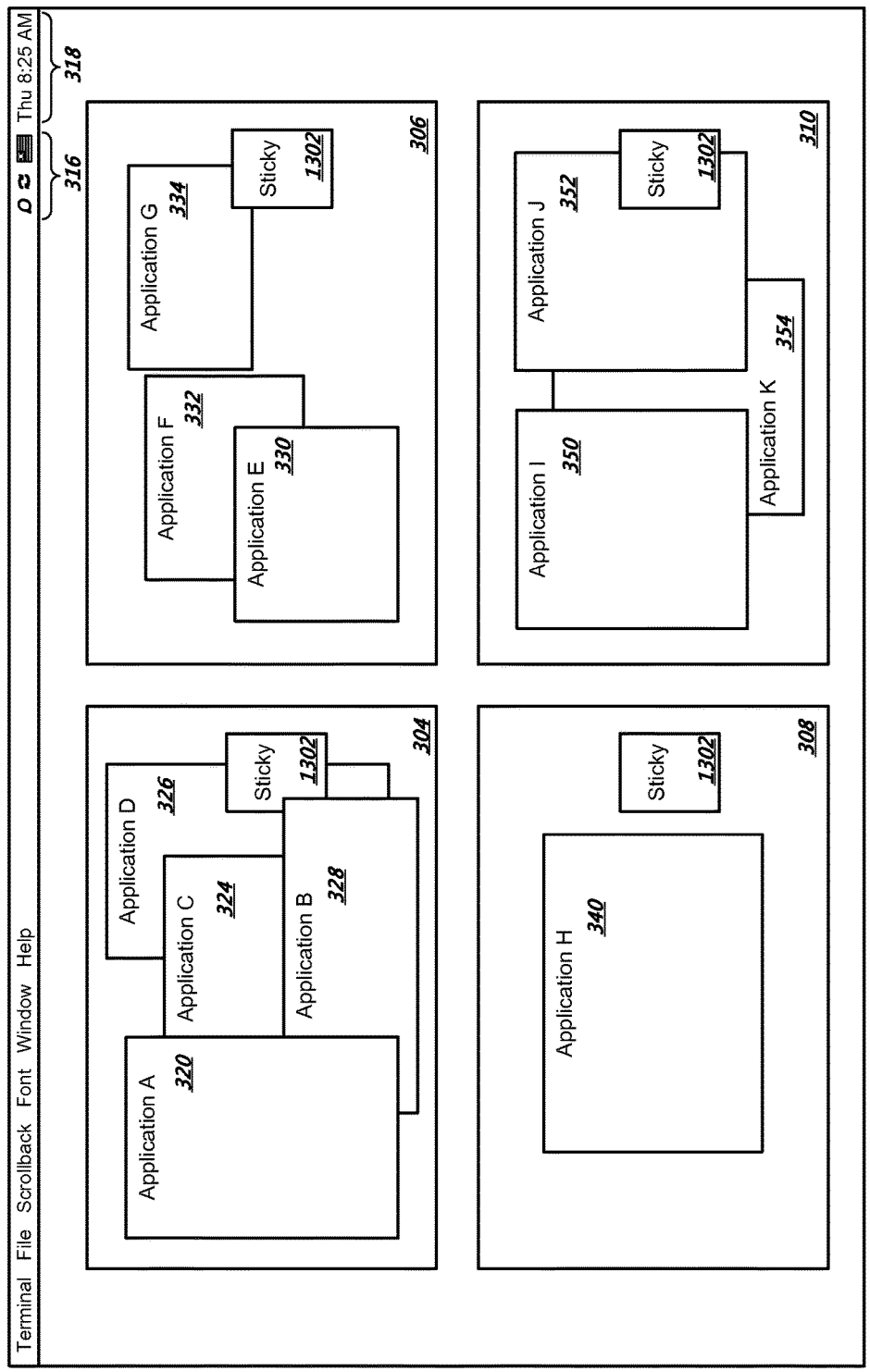
FIG. 13 depicts a screenshot of a computer display showing an application or window that is visible in multiple spaces.

Some program windows can be more important to the user than others and the user may want to have such window presented in all of the spaces. FIG. 13 depicts a screenshot of a computer display showing an application or window ("sticky") 1302 that is visible in multiple spaces. The sticky 1302 can be moved within the spaces like all other space contents. Generally, space contents can be marked as sticky to ensure that they are viewable, regardless of which space(s) is currently being shown on the display.

In some implementations, if an application has been marked as sticky, its corresponding program window(s) can appear in all spaces. For instance, it may be useful to always have a program window for a chat application visible regardless of which space is currently active. Users can use the space preferences engine 218 to choose whether an application or program window is sticky. If desired, the user can un-mark a sticky application or program window so that it only appears in a single space.

In FIG. 13, the program window 1302 corresponds to a sticky application. The program window 1302 appears in each of the spaces (304, 306, 308, 310) shown on the display so that the program window 1302 is viewable regardless of which space is being shown. In some implementations, space contents can be made sticky for spaces belonging to a certain group. This means that the application or window can occur in more than one but fewer than all spaces. For example, a chat application could appear in all spaces belonging to a "home" group and an email application could appear in all spaces belonging to a "work" group. Applications or windows can be sticky in more than one group of spaces, i.e. groups associated with different workgroups can be overlapping so that they share members.

FIG. 14 depicts a configuration window 1400 for specifying preferences related to Exposé and spaces. A top section 1402 can be used for specifying actions to take based on mouse gestures. A middle section 1404 can be used to specify keyboard shortcuts related to Exposé functionality. A bottom section 1406 can be used to specify keyboard shortcuts related to using spaces.

Users can use the configuration window shown in FIG. 14 to specify responses to mouse gestures. Fields 1408-1414 can be used to specify an action to take when the mouse pointer is positioned in one of the screen corners. For example, field 1414 indicates that all the program windows will have active corners. In some implementations, actions can be specified for active corners, such as switching to the next or previous space in the list, or switching to the last space that was viewed. For example, moving the mouse to one active corner could cause a switch to the next space in the list, moving the mouse to a second active corner could cause a switch to the previous space in the list, and moving the mouse to a third active corner could cause the display to switch to another space that was most recently displayed. In the middle section 1404, keyboard shortcuts (1416-1422) can be specified for changing the mode to display all windows, program windows associated with an application, or a dashboard respectively. For example, dashboard refers to the Dashboard function that is available in the Apple OS X® operating system to perform tasks or access information. In the bottom section 1406, a user can choose to enable spaces via a checkbox 1424, specify a keyboard shortcut 1426 for spaces, or click on a button 1428 to open another configuration window such as the one shown in FIG. 15.

Figure 15:
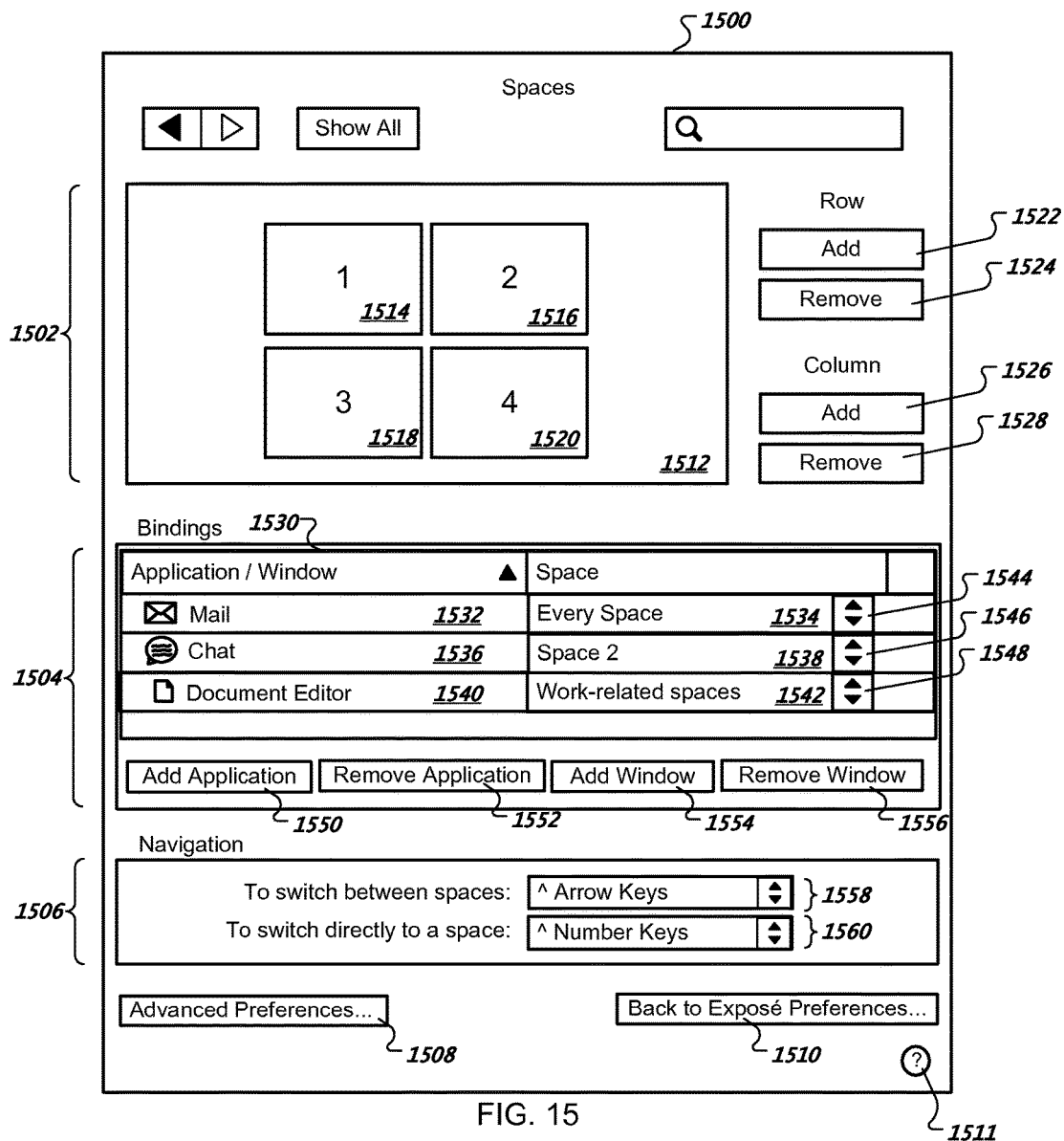
FIG. 15 depicts a window that can be used for configuring spaces.

FIG. 15 depicts a window 1500 that can be used for configuring spaces. A top section 1502 can be used to add or removing spaces. A middle section 1504 can be used for binding applications or windows to spaces or groups of spaces. A bottom section 1506 can be used for specifying hotkeys used for navigating among spaces. Buttons 1508, 1510 or 1511 located at the bottom of the window 1500 can be used to open windows with additional content.

The top section 1502 includes an area 1512 with numbered icons 1514-1520 depicting spaces. A user can use buttons 1522-1528 to add or remove spaces, for example clicking on the add row button 1522 to add a new row of space icons in the area 1512. As has been mentioned, non-symmetric patterns of spaces can be used.

In contrast to adding a new space with an input control (such as the add row button 1522), spaces can also be added automatically n some implementations. For example, one or more windows for a newly launched application(s) can automatically be opened in a new space. In one implementation, such an arrangement could be used to self-organize useable space as windows for new applications are opened.

The middle binding section 1504 has a table 1530 with space content bound to named groups of spaces. In this example, a mail application 1532 is assigned to a first group "Every Space" 1534, a chat application 1536 is assigned to a second group "Space 2" 1538, and a document editor application 1540 is assigned to a third group "Work-related Spaces" 1542. A user can change which space group an application is bound to by clicking on the icons 1544-1548 next to the selected group, or by selecting the group and using the arrow keys to scroll through a list of available groups. Buttons 1550-1556 can be used for adding or removing applications or windows from the table 1530. In some implementations, a window from anywhere on the screen can be bound to a space by selecting it with the mouse and dragging it to one of the numbered icons 1514-1520 in the top section 1502. For example, this can cause a new binding to appear in the table 1530. In some implementations, one or more spaces to which an application or window is bound can be changed by dragging the corresponding icon or field in table 1530 to a destination space depicted in the top section 1502. The entry in the table 1530 corresponding to the application can be updated to show the application or window bound to the destination space. For example, if an entry for the chat application 1536 in the table 1530 was dragged to the icon 1518 for space 3, the table 1530 can be updated to show that the chat application is now bound to space 3.

The bottom navigation section 1506 has fields for assigning keyboard shortcuts to navigation actions. The top field 1558 specifies which keyboard shortcuts trigger a switch between spaces, i.e. switching to a space positioned relative to the space currently being viewed. In the example shown, holding down the control key on the keyboard (signified by the caret character, "^") while pressing an arrow key causes a switch to the space in the direction corresponding to the arrow key.

The bottom field 1560 of the navigation section 1506 specifies which keyboard shortcuts trigger a switch to a specific space, i.e. regardless of the currently viewed space. In the example shown, holding down the control key on the keyboard (signified by the caret character, "^") while pressing a number key causes a switch to the space corresponding to the key number. Similar shortcuts can be defined for other spaces-related operations, such as moving space content from one space to another or rearranging two or more spaces.

Buttons located at the bottom of the window 1500 can be used to open windows with additional content. An advanced preferences button 1508 can be used to open an advanced preferences window shown in FIG. 16 (described below). An Exposé preferences button 1510 can be used to return to the Exposé preferences window 1400. A help button 1511 can be used to access help related to the window 1500.

Figure 16:
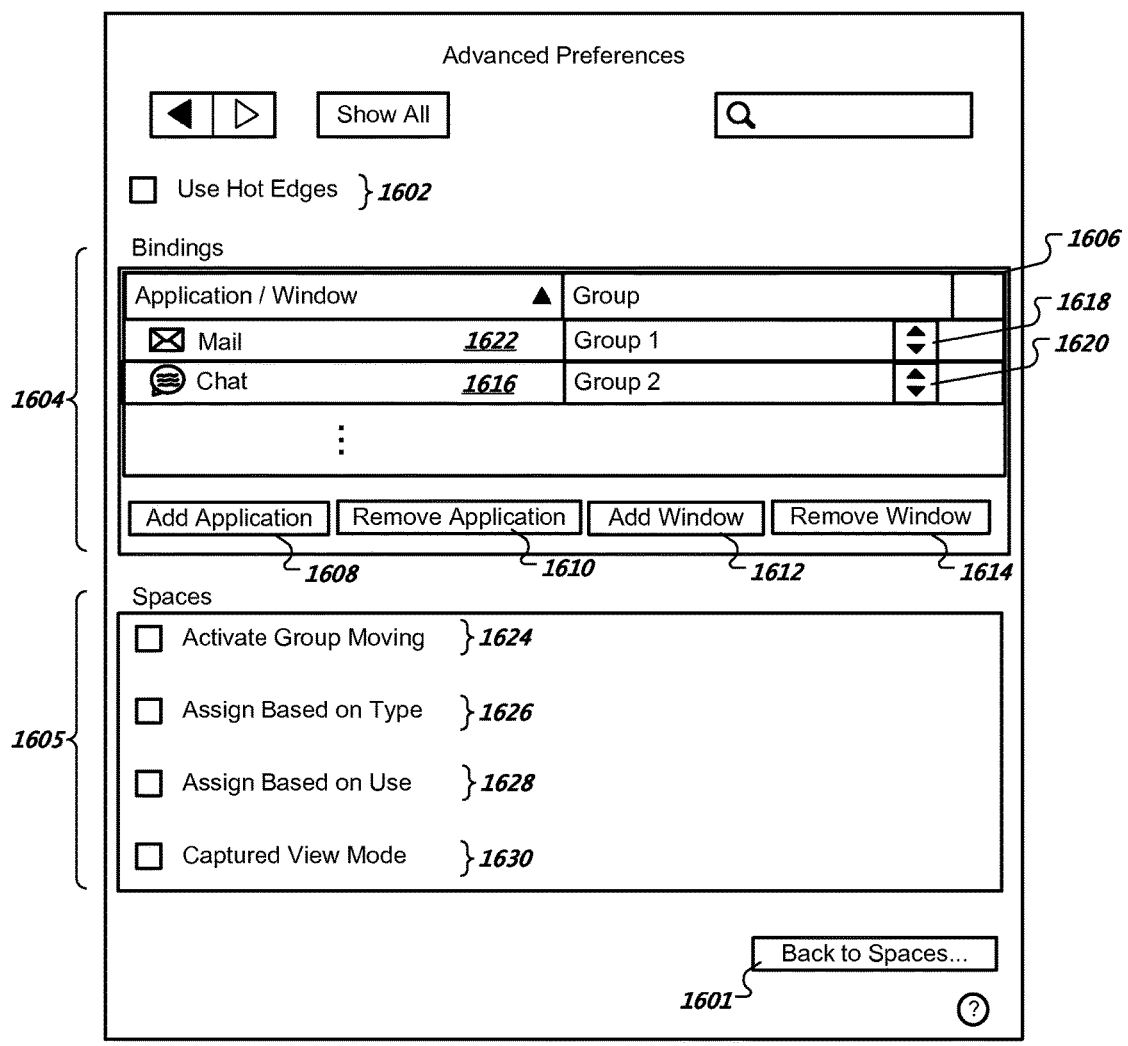
FIG. 16 depicts an example of an advanced preferences window which can be used for specifying advanced preferences in a user interface.

FIG. 16 depicts an example of an advanced preferences window 1600 which can be used for specifying advanced preferences in a user interface. A user can specify preferences to the space preferences engine 218 using the advanced preferences window 1600. A button 1601 can be used to close the window 1600 and return the user to the spaces window 1500 depicted in FIG. 15.

A first check box 1602 can be used for specifying whether to use hot edges (described below in further detail); if the box 1602 is checked, hot edges are enabled, otherwise hot edges are disabled. A bindings section 1604 can be used for assigning applications or windows to groups. A spaces section 1605 can be used for specifying group preferences.

The bindings section 1604 can be used to associated an application(s) or program window(s) to a group. Groups can be used to perform operations on a set of applications or windows at the same time. For example, in FIG. 15 the "Document Editor" was assigned to the group "Work-related spaces". In some implementations, if an application is bound to a group, all of its associated program windows are bound to the same group.

A table 1606 can be used to associate content with groups. Groups can be managed, for example, by using buttons 1608, 1610, 1612, 1614 to add and remove applications and program windows to or from the table 1606. For example, a chat application 1616 could be removed by clicking on the remove application button 1610. Groups that are assigned to an application or program window can be changed by using a selector icon 1618, 1620 located next to the entries in the table 1606 which could, for instance, provide a popup list from which a group could be selected. For example, a mail program window could be assigned to Group 2 by clicking on the its selector icon 1618 and choosing the corresponding entry. In some implementations, all applications or windows having the same type can be transferred with a single command from one space to a different space. For example, this applies when the applications of a common type have previously been grouped together, or the common type can be detected when executing the command. The command can be made using a hot key, a mouse operation, or any other kind of input.

The spaces section 1605 can be used to specify preferences related to groups. A first checkbox 1624 can be used to specify whether group moving should be enabled. The term "group moving" refers to moving all members of a group from one space to another at one time using a single command. For example, a user can use a single keyboard or mouse command to move all the applications and windows associated with Group 1 to a new space.

A second checkbox 1626 can be used to specify whether new applications or program windows should be assigned to one or more groups based on type. That is, program windows or applications associated with the operating system that share a common feature or are to be used similarly can be assigned to one group and other program windows or applications can be assigned to another group. For example, it can be predefined that an iTunes application, available from Apple Computer in Cupertino, Calif., should be assigned to a particular space, and similarly for other applications.

A third checkbox 1628 can be used to specify whether new applications or windows should be assigned to a group(s) based on how they are used. In some implementations, use can be determined based on what type of actions the computer 102 performs associated with an application or program window. For example, applications or program windows used for editing content, such as a text editor or image editor, could be assigned to a first group, applications or program windows assigned used for internet or network access could be assigned to a second group, and applications or program windows used for playing content, such as video players or music players, could be assigned to a third group. In some implementations, use can be determined based on heuristics or pattern matching, e.g. if the user may normally put certain applications and program windows in the same space, those applications and program windows could be assigned to a common group. These use-based determinations can be done by the space management component 118.

In some implementations, applications or program windows can be assigned to multiple groups. For instance, if both the second checkbox 1626 and third checkbox 1628 are selected, a new application or program window can be assigned to a group A and a group B. In some implementations, an application(s) or program window(s) can be assigned to a single group; in this case, priority can be given to one or the other checkbox. In some implementations, the checkboxes which are mutually exclusive can be replaced with radio selectors that only allow a single selection to be made at a time.

A fourth checkbox 1630 can be used to specify that the view mode display (see, e.g., FIG. 3) can include captured content. That is, in some situations, the space management component 118 can capture the contents of one or more spaces at a given moment and present this static content in the view mode.

Figure 17:
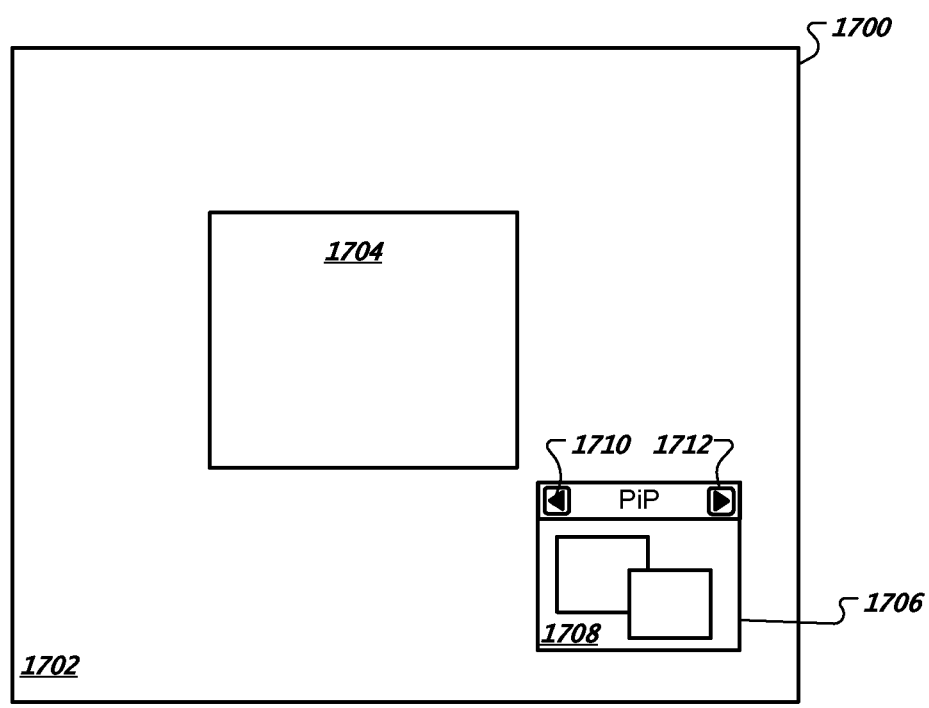
FIG. 17 depicts an example screenshot of display 1700 showing a space 1702.

FIG. 17 depicts an example screenshot of display 1700 showing a space 1702. Here, the contents of the space 1702 include a window 1704. There is also presented an inset window 1706 showing the contents of anther space 1708. That is, the contents of the first space 1702 are displayed spread out over the display at normal size and the contents of the second space 1708 are scaled to fit in the inset window. A user can interact with and use the contents of either space.

In some implementations, a display can show a space, such as 1702, at full size and display a second space, such as 1708, in an inset window 1706, whose contents are scaled to fit the window. In some implementations, the inset window 1706 can always be displayed "over" the contents of the first space 1702 such that the region of the display containing the inset window 1706 displays the inset window 1706 and the contents of the second space 1708 wherever overlap occurs with content in the first space 1702. The spaces 1702 and 1706 can be presented using the space presentation engine 210.

A user can choose to change the space that is displayed in the inset window 1706, for example, by clicking on buttons 1710, 1712 to cycle through the available spaces. For example, clicking on the first button 1710 could cause the inset window to display the space preceding the current space 1708 in a list or matrix such as that shown in FIG. 3. In some implementations, mouse gestures or keyboard shortcuts could be used to cause a change of spaces in the inset window 1706. In some implementations, a user can swap the space 1702 zoomed out on the display 1700 and the space 1708 in the inset window 1706, such as through the use of mouse or keyboard command.

Figure 18A:
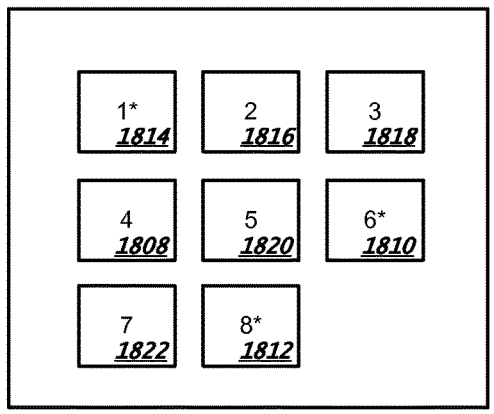
FIGS. 18A-D illustrates how a command bar can be used to facilitate moving a window among a group of spaces.
Figure 18B:
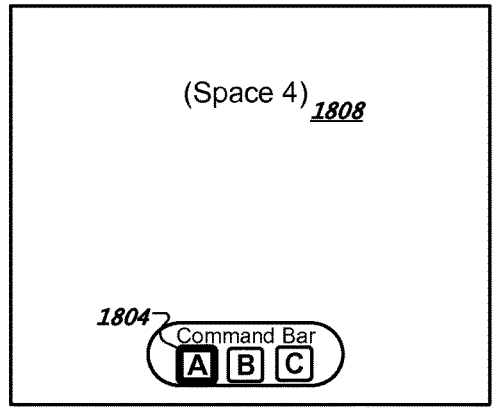
Figure 18C:
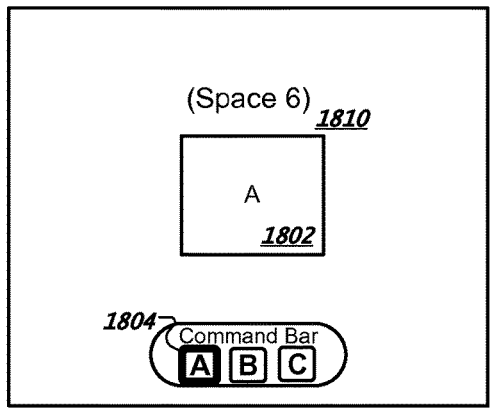

FIGS. 18A-D illustrate how a command bar can be used to facilitate moving among a group of spaces. FIG. 18A depicts a group of spaces shown in view mode. FIGS. 18B-C show several depictions of some of the spaces shown in FIG. 18A expanded to view mode. A user can provide input via a mouse or keyboard to navigate to any of the spaces. Particularly, as will now be described, the user can navigate to each of the spaces that contains a specific window or application.

Figure 18D:
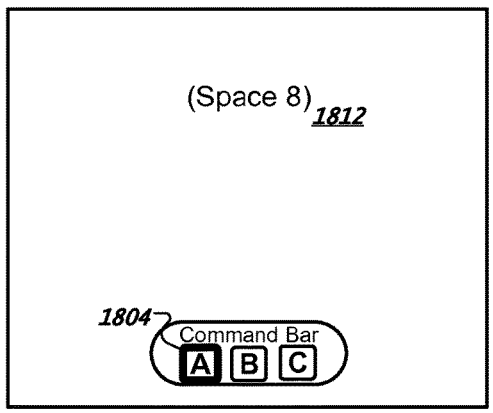

In some instances, an application or program window can be assigned to multiple spaces. In the example depicted in FIGS. 18A-C, an application associated with a program window 1802 is launched from an icon 1804 in a command bar 1806. The same command bar 1806 can be present when a space is shown in view mode, as shown in FIGS. 18B-D.

The application can be bound to several spaces, such as by using the spaces preferences window described above and shown in FIG. 15.

Application A is bound to space 1 (1814), space 6 (1810) and space 8 (1812), as indicated with an asterisk * in FIG. 18A; application A is not associated with spaces 2, 3, 4, 5, or 7 (1816, 1808, 1820, 1822).

In FIG. 18B, the application A is not presently shown because it is not part of the space 4 that is currently open. FIGS. 18B-D show that the user can launch application A by, in some implementations, clicking on icon 1804 in the command bar 1806. Clicking on the icon 1804 launches the window for the application, as illustrated in FIG. 18C. This can also activate the space 6, which is the next space in the sequence (1-8) that contains application A. For example, this functionality can be turned on or off with a preference setting. If the user again clicks on the icon 1804, this will open the next space that contains application A, here the space 8, as shown in FIG. 18D. While this example involves the application being initiated by the user, other possibilities can exist. For example, a similar cycling around the relevant spaces can be done after an application is automatically launched by the system.

Figure 19A:
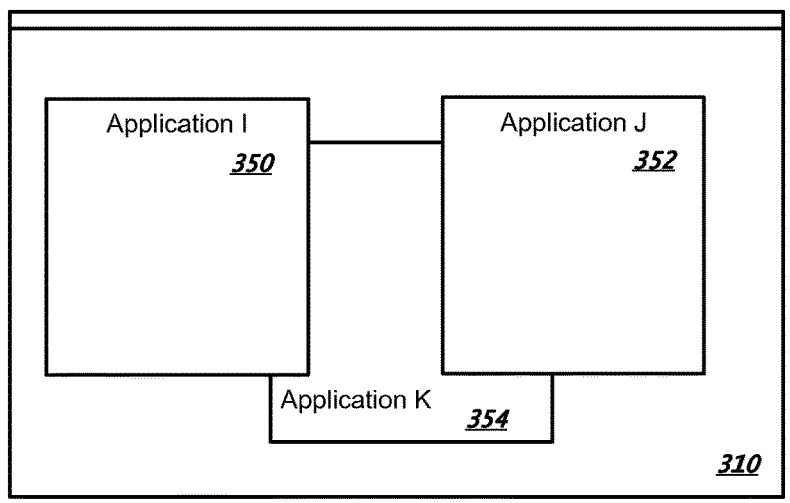
FIGS. 19A-C depict example screenshots of a user interface showing the use of "hot edges".
Figure 19B:
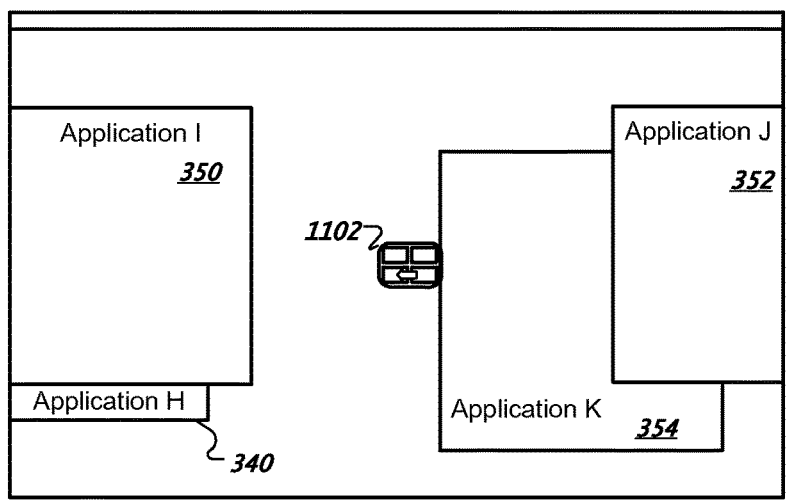
Figure 19C:
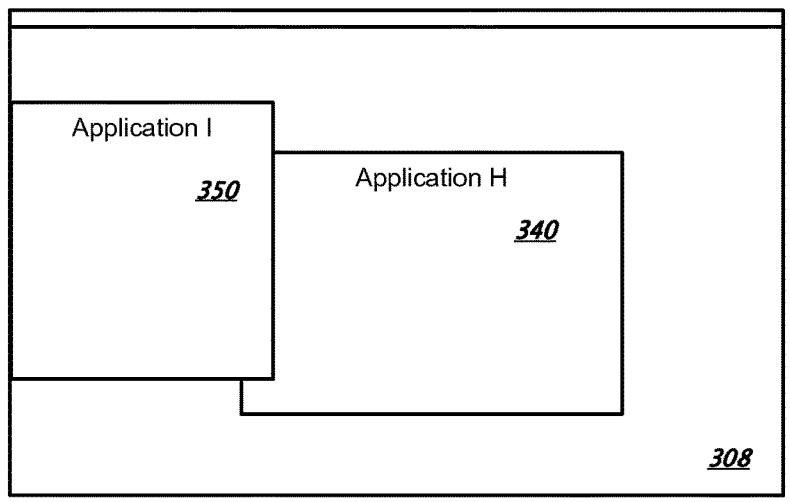

FIGS. 19A-C depict example screenshots of a user interface showing the use of "hot edges". Hot edges is a term used to describe a predefined location of the display where an application or window can be dragged to automatically place it into another space. A hot edge can be defined in any or all location on the screen. For example, a corner can be defined as a hot edge so that dragging a program window within a certain area, such as within 100 pixels of a display edge, can cause the program window to be moved to a space associated with that area. For example, if two spaces are horizontally adjacent, a program window can be transferred from one to the other by dragging it with the mouse until it touches the edge of their common border. The spaces can then be shifted "underneath" the dragged window to effectuate the transfer. Edges of the display can be divided into segments corresponding to different spaces, for example if there are more spaces than edges. In another example, by dragging a window to a corner, the window can be moved from one space to another space that is "diagonal" from the first one when observed in view mode. In some implementations, for example where there is no geometric relationship between spaces in the view mode, the corner hot edge can cause a switch to a next one of the multiple spaces.

FIG. 19A shows the fourth space 310 of FIG. 3. A user wishes to move the program window 350 to another space. The user therefore moves the program window 350 to the edge of the space. This triggers an action to move the current space out of the screen and move in another (e.g. adjacent) space. FIG. 19B depicts a screenshot of an animated transition as the program window 350 is held in place while the remaining contents of the fourth space 310, i.e. the program windows 352, 354, are sliding toward the right side of the display and the contents of the third space 308, i.e. the program window 340, is sliding in from the left side. This sliding of the spaces is done to facilitate the move of the window 350 to another space. FIG. 19C depicts the display after the transition is complete; the third space 308 is now in view with the moved program window 350 positioned on the left side of the display along with the other contents of the third space 308, i.e. the program window 340. In some implementations, an icon 1102 such as the one used in FIG. 11 can be displayed while the transition is in progress that graphically depicts the transfer. As another example, the user can drag the window toward any portion of the icon 1102 to initiate a move of the window to the space corresponding to that portion. Thus, hot edges can be located elsewhere than at the perimeter of the screen or space. In some implementations, a user can change spaces via hot keys or gestures while dragging a program window to place the program window in a different space, such as by holding down a control (Ctrl) key and pressing one of the arrow keys. It can also be possible to switch to another space while dragging a window by hitting any of the space movement keys, e.g., hot keys, or by making mouse gestures, to name a few examples. Relocations of content between spaces can be managed by the space identification engine 212, and the resulting display can be generated by the space presentation engine 210.

Figure 20:
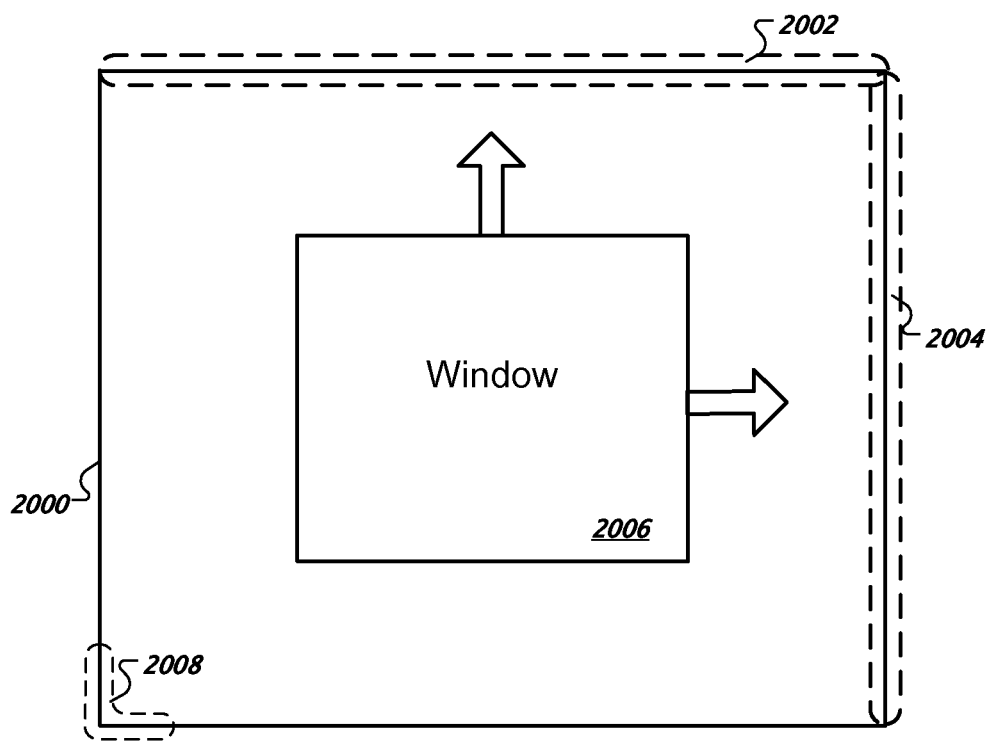
FIG. 20 depicts a screenshot of a space which visually indicates the positions of adjacent spaces.

FIG. 20 depicts a screenshot of a space 2000 which visually indicates the positions of adjacent spaces. In some implementations, borders of a space are colored to indicate the presence of an adjacent space. A user wishing to move a program window from the currently space to another space can use the visual indication to determine where the program window can be moved.

In example shown in FIG. 20, visual indicators can be displayed along the edges of a space 2000 to indicate the presence of adjacent spaces. A top indicator 2002 indicates that a space is located "above" the current space and an indicator on the right side 2004 indicates that a space is located "to the right" of the current space. These spatial concepts can be based on the distribution of spaces that can be seen in view mode. See, for example, FIG. 3, where some windows are located above or to the right of another window. The top and side indicators 2002, 2004 signify to the user that the window 2006 can be moved to spaces in the corresponding positions (as described above); the lack of an indicator on the left and bottom indicate that spaces are not available to the left and bottom side. A corner 2008 can be defined as a hot edge, for example to operate as in the examples described above.

In some implementations, the spaces in the view mode are ordered, so that they define a sequence. Then, the hot edge on the right side of the screen, for example, can initiate a transition to the next space in the sequence. Similarly, another hot edge on, say, the left side can effectuate a transition to the previous space in the sequence. As another example, more than one hot edge can be located on a single screen edge. That is, several separate hot edges can be defined at any edge of the screen, such as the right one, so that the user has more than one option for choosing the target space when dragging the window toward that screen edge.

Other screen portions than edges can be used as "hot edges". For example, the corners of the screen, or of a particular window or application, can be used as a predefined location for initiating a move between spaces.

Any of the areas 2002, 2004 and 2006 can be used for a gesture definition in one implementation. For example, a gesture performed in the bottom left corner 2008 of the screen can cause some or all contents to be moved to another space.

In some implementations, a window being moved can have indicators on the edges instead of or in addition to indicators on the edges of the space. Indicators can be combined with other concepts described above, such as applying indicators to inset windows or highlighting edges in view mode. In some implementations, indicators can be depicted by use of color, boarder thickness, patterns, animations, icons or any combination thereof. For example, one or more hot edges can be configured to "glow" when a window is picked for dragging, or is brought close to the edge(s). This can be done by the space animation engine 216.

In some implementations, gestures could be used to pick up multiple windows, such as windows of the same type or all windows of an application, and move them to other spaces using the "hot edges" technique described above. For example, using a keyboard shortcut or mouse gesture, a user could pick up all the windows for an image editing application and move them to an adjacent space.

In the above description, for purposes of explanation, numerous specific details are set forth in order to provide a thorough understanding. It will be apparent, however, to one skilled in the art that implementations can be practiced without these specific details. In other instances, structures and devices are shown in block diagram form in order to avoid obscuring the disclosure.

In particular, one skilled in the art will recognize that other architectures and graphics environments can be used, and that the examples can be implemented using graphics tools and products other than those described above. In particular, the client/server approach is merely one example of an architecture for providing the functionality described herein; one skilled in the art will recognize that other, non-client/server approaches can also be used. Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An apparatus for performing the operations herein can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it can prove convenient to construct more specialized apparatuses to perform the method steps. The required structure for a variety of these systems will appear from the description. In addition, the present examples are not described with reference to any particular programming language. It will be appreciated that a variety of programming languages can be used to implement the teachings as described herein. Furthermore, as will be apparent to one of ordinary skill in the relevant art, the modules, features, attributes, methodologies, and other aspects can be implemented as software, hardware, firmware or any combination of the three. Of course, wherever a component is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present description is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method comprising:
   at a computing device with one or more input devices and a display:
      displaying, on the display, a first virtual space of a plurality of virtual spaces, wherein:
         displaying the first virtual space includes concurrently displaying at least a portion of a window of a first application with at least a portion of a window of a second application that is different from the first application, wherein a second virtual space of the plurality of virtual spaces is associated with a third application and a fourth application that are different from the first application and the second application;
      while displaying the first virtual space on the display, receiving, via the one or more input devices, an input that corresponds to a request to activate the third application; and
      in response to receiving the input that corresponds to the request to activate the third application, replacing display of the first virtual space with display of the second virtual space, wherein replacing display of the first virtual space with display of the second virtual space includes:
         ceasing to display the first virtual space on the display, and
         displaying the second virtual space on the display, wherein displaying the second virtual space, on the display, includes concurrently displaying at least a portion of a window of the third application with at least a portion of a window of the fourth application.

2. The method of claim 1, wherein the input that corresponds to the request to activate the third application includes a selection of a hot-key associated with the third application.

3. The method of claim 1, wherein the input that corresponds to the request to activate the third application includes a selection of a link associated with the third application.

4. The method of claim 1, wherein ceasing to display the first virtual space on the display and displaying the second virtual space on the display includes replacing the first virtual space with the second virtual space using an animation technique.

5. The method of claim 4, wherein replacing the first virtual space with the second virtual space using the animation technique includes moving at least the portion of the window of the first application and at least the portion of the window of the second application out of view on the display and moving at least the portion of the window of the third application and at least the portion of the window of the fourth application into view on the display.

6. The method of claim 5, wherein moving at least the portion of the window of the first application and at least the portion of the window of the second application out of view on the display includes executing the animation technique, wherein the animation technique causes the portion of the window of the first application and at least the portion of the window of the second application to slide off an edge of the display, and
   wherein moving at least the portion of the window of the third application and at least the portion of the window of the fourth application into view on the display includes executing the animation technique, wherein the animation technique causes the portion of the window of the third application and at least the portion of the window of the fourth application to slide into view on the display.

7. A non-transitory computer-readable medium storing instructions executable by a computing device to perform operations comprising: at the computing device with one or more input devices and a display:
   displaying, on the display, a first virtual space of a plurality of virtual spaces, wherein:
      displaying the first virtual space includes concurrently displaying at least a portion of a window of a first application with at least a portion of a window of a second application that is different from the first application, wherein a second virtual space of the plurality of virtual spaces is associated with a third application and a fourth application that are different from the first application and the second application;
   while displaying the first virtual space on the display, receiving, via the one or more input devices, an input that corresponds to a request to activate the third application; and
   in response to receiving the input that corresponds to the request to activate the third application, replacing display of the first virtual space with display of the second virtual space, wherein replacing display of the first virtual space with display of the second virtual space includes:
      ceasing to display the first virtual space on the display, and
      displaying the second virtual space on the display, wherein displaying the second virtual space, on the display, includes concurrently displaying at least a portion of a window of the third application with at least a portion of a window of the fourth application.

8. The non-transitory computer-readable medium of claim 7, wherein the input that corresponds to the request to activate the third application includes a selection of a hotkey associated with the third application.

9. The non-transitory computer-readable medium of claim 7, wherein the input that corresponds to the request to activate the third application includes a selection of a link associated with the third application.

10. The non-transitory computer-readable medium of claim 7, wherein ceasing to display the first virtual space on the display and displaying the second virtual space on the display includes replacing the first virtual space with the second virtual space using an animation technique.

11. The non-transitory computer-readable medium of claim 10, wherein replacing the first virtual space with the second virtual space using the animation technique includes moving at least the portion of the window of the first application and at least the portion of the window of the second application out of view on the display and moving at least the portion of the window of the third application and at least the portion of the window of the fourth application into view on the display.

12. The non-transitory computer-readable medium of claim 11, wherein moving at least the portion of the window of the first application and at least the portion of the window of the second application out of view on the display includes executing the animation technique, wherein the animation technique causes the portion of the window of the first application and at least the portion of the window of the second application to slide off an edge of the display, and
wherein moving at least the portion of the window of the third application and at least the portion of the window of the fourth application into view on the display includes executing the animation technique, wherein the animation technique causes the portion of the window of the third application and at least the portion of the window of the fourth application to slide into view on the display.

13. A system comprising:
a computing device with one or more input devices and a display; and
a non-transitory computer-readable medium storing instructions executable by the
computing device to perform operations comprising:
displaying, on the display, a first virtual space of a plurality of virtual spaces, wherein:
displaying the first virtual space includes concurrently displaying at least a portion of a window of a first application with at least a portion of a window of a second application that is different from the first application, wherein a second virtual space of the plurality of virtual spaces is associated with a third application and a fourth application that are different from the first application and the second application;

while displaying the first virtual space on the display, receiving, via the one or more input devices, an input that corresponds to a request to activate the third application; and
in response to receiving the input that corresponds to the request to activate the third application, replacing display of the first virtual space with display of the second virtual space, wherein replacing display of the first virtual space with display of the second virtual space includes:
ceasing to display the first virtual space on the display, and
displaying the second virtual space on the display, wherein displaying the second virtual space, on the display, includes concurrently displaying at least a portion of a window of the third application with at least a portion of a window of the fourth application.

14. The system of claim 13, wherein the input that corresponds to the request to activate the third application includes a selection of a hotkey associated with the third application.

15. The system of claim 13, wherein the input that corresponds to the request to activate the third application includes a selection of a link associated with the third application.

16. The system of claim 13, wherein ceasing to display the first virtual space on the display and displaying the second virtual space on the display includes replacing the first virtual space with the second virtual space using an animation technique.

17. The system of claim 16, wherein replacing the first virtual space with the second virtual space using the animation technique includes moving at least the portion of the window of the first application and at least the portion of the window of the second application out of view on the display and moving at least the portion of the window of the third application and at least the portion of the window of the fourth application into view on the display.

18. The system of claim 17, wherein moving at least the portion of the window of the first application and at least the portion of the window of the second application out of view on the display includes executing the animation technique, wherein the animation technique causes the portion of the window of the first application and at least the portion of the window of the second application to slide off an edge of the display, and
wherein moving at least the portion of the window of the third application and at least the portion of the window of the fourth application into view on the display includes executing the animation technique, wherein the animation technique causes the portion of the window of the third application and at least the portion of the window of the fourth application to slide into view on the display.

* * * * *